United States Patent
Thompson et al.

(10) Patent No.: US 8,321,578 B2
(45) Date of Patent: Nov. 27, 2012

(54) SYSTEMS AND METHODS FOR NETWORK VIRTUALIZATION

(75) Inventors: J. Barry Thompson, Easton, PA (US); Kul Singh, New York, NY (US); Pierre Fraval, New York, NY (US)

(73) Assignee: Tervela, Inc., New York, NY (US)

( * ) Notice: Subject to any disclaimer, the term of this patent is extended or adjusted under 35 U.S.C. 154(b) by 0 days.

(21) Appl. No.: 13/152,939

(22) Filed: Jun. 3, 2011

(65) Prior Publication Data

US 2011/0231470 A1 Sep. 22, 2011

Related U.S. Application Data

(63) Continuation of application No. 11/316,778, filed on Dec. 23, 2005, now Pat. No. 7,970,918.

(60) Provisional application No. 60/641,988, filed on Jan. 6, 2005, provisional application No. 60/688,983, filed on Jun. 8, 2005.

(51) Int. Cl.
*G06F 15/16* (2006.01)
*G06F 15/173* (2006.01)
*G06F 3/00* (2006.01)
*G06F 9/44* (2006.01)
*G06F 9/46* (2006.01)
*G06F 13/00* (2006.01)

(52) U.S. Cl. ......... 709/230; 709/238; 719/313; 719/328

(58) Field of Classification Search .................. 709/230, 709/238; 719/313, 328

See application file for complete search history.

(56) References Cited

U.S. PATENT DOCUMENTS

| | | | |
|---|---|---|---|
| 5,321,542 | A | 6/1994 | Freitas et al. |
| 5,557,798 | A | 9/1996 | Skeen et al. |
| 5,870,605 | A | 2/1999 | Bracho et al. |
| 5,905,873 | A | 5/1999 | Hartmann et al. |
| 6,092,080 | A | 7/2000 | Gustman |
| 6,141,705 | A | 10/2000 | Anand et al. |
| 6,189,043 | B1 | 2/2001 | Buyukkoc et al. |
| 6,507,863 | B2 | 1/2003 | Novaes |
| 6,542,588 | B1 | 4/2003 | Mashinsky |
| 6,628,616 | B2 | 9/2003 | Licht |
| 6,754,773 | B2 | 6/2004 | Ulrich et al. |
| 6,832,297 | B2 | 12/2004 | Pfister et al. |

(Continued)

FOREIGN PATENT DOCUMENTS

CN 1432950 A 7/2003

(Continued)

OTHER PUBLICATIONS

International Search Report issued on Sep. 24, 2007, in related application PCT/US05/47189.

(Continued)

*Primary Examiner* — George C Neurauter
(74) *Attorney, Agent, or Firm* — Goodwin Procter LLP

(57) ABSTRACT

Message publish/subscribe systems are required to process high message volumes with reduced latency and performance bottlenecks. The end-to-end middleware architecture proposed by the present invention is designed for high-volume, low-latency messaging by, among other things, reducing intermediary hops with neighbor-based routing, introducing efficient native-to-external and external-to-native protocol conversions, monitoring system performance, including latency, in real time, employing topic-based and channel-based message communications, and dynamically optimizing system interconnect configurations and message transmission protocols.

57 Claims, 21 Drawing Sheets

U.S. PATENT DOCUMENTS

| | | | |
|---|---|---|---|
| 6,871,113 B1 | 3/2005 | Maxim et al. | |
| 7,020,697 B1 | 3/2006 | Goodman et al. | |
| 7,349,980 B1 | 3/2008 | Darugar et al. | |
| 7,437,417 B2 | 10/2008 | Reynolds et al. | |
| 7,970,918 B2 * | 6/2011 | Thompson et al. | 709/230 |
| 2002/0026533 A1 | 2/2002 | Dutta et al. | |
| 2002/0059425 A1 | 5/2002 | Belfiore et al. | |
| 2002/0078265 A1 | 6/2002 | Frazier et al. | |
| 2002/0093917 A1 | 7/2002 | Knobbe et al. | |
| 2002/0120717 A1 | 8/2002 | Giotta | |
| 2003/0105931 A1 | 6/2003 | Weber et al. | |
| 2003/0115317 A1 | 6/2003 | Hickson et al. | |
| 2003/0177412 A1 | 9/2003 | Todd | |
| 2003/0225857 A1 | 12/2003 | Flynn et al. | |
| 2003/0226012 A1 | 12/2003 | Asokan et al. | |
| 2003/0236970 A1 | 12/2003 | Palmer et al. | |
| 2004/0001498 A1 | 1/2004 | Chen et al. | |
| 2004/0019645 A1 | 1/2004 | Goodman et al. | |
| 2004/0049774 A1 | 3/2004 | Boyd et al. | |
| 2004/0076155 A1 | 4/2004 | Yajnik et al. | |
| 2004/0083305 A1 | 4/2004 | Wang et al. | |
| 2004/0225554 A1 | 11/2004 | Chiappetta et al. | |
| 2004/0254993 A1 | 12/2004 | Mamas | |
| 2005/0021622 A1 | 1/2005 | Cullen | |
| 2005/0044197 A1 | 2/2005 | Lai | |
| 2005/0251556 A1 | 11/2005 | Ginis et al. | |
| 2005/0276278 A1 | 12/2005 | Jung et al. | |
| 2006/0056628 A1 | 3/2006 | Todd | |
| 2006/0146991 A1 | 7/2006 | Thompson et al. | |
| 2006/0146999 A1 | 7/2006 | Thompson et al. | |
| 2006/0168070 A1 | 7/2006 | Thompson et al. | |
| 2006/0168331 A1 | 7/2006 | Thompson et al. | |
| 2007/0025351 A1 | 2/2007 | Cohen | |
| 2007/0088924 A1 | 4/2007 | Jean-Denis et al. | |

FOREIGN PATENT DOCUMENTS

| | | |
|---|---|---|
| CN | 1477575 A | 2/2004 |
| EP | 0996255 A2 | 4/2000 |
| EP | 1000503 A1 | 5/2000 |
| EP | 1011236 A2 | 6/2000 |
| JP | 8088651 A | 4/1996 |
| JP | 08-191336 A | 7/1996 |
| JP | 11-045204 A | 2/1999 |
| JP | 2002281070 A | 9/2002 |
| JP | 2003060678 A | 2/2003 |
| JP | 2004348680 A | 12/2004 |
| JP | 2006523905 T | 10/2006 |
| WO | WO-0051290 A2 | 8/2000 |
| WO | WO-0219595 A2 | 3/2002 |
| WO | WO-0245344 A2 | 6/2002 |
| WO | WO-03034255 A1 | 4/2003 |
| WO | WO-2004072800 A2 | 8/2004 |
| WO | WO-2004080030 A1 | 9/2004 |

OTHER PUBLICATIONS

International Search Report issued on Sep. 21, 2007, in related application PCT/US06/00477.
Written Opinion of the Itnernational Searching Authority, PCT/US05/47217, dated Nov. 19, 2006, 6 pages.
International Search Report, PCT/US05/47637, dated Mar. 1, 2007, 3 pages.
Written Opinion of the Itnernational Searching Authority, PCT/US05/47637, dated Mar. 1, 2007, 8 pages.
International Search Report, PCT/US05/47216, Oct. 19, 2006, 4 pages.
Written Opinion of the International Searching Authority, PCT/US05/47216, Oct. 19, 2006, 7 pages.
International Search Report, Tervela, Inc., PCT/US05/47217, dated Nov. 19, 2006, 3 pages.
International Search Report, Tervela, Inc., PCT/US05/47217, dated Jan. 24, 2007, 3 pages.
Communication from European Patent Office for Application No. 05855728.1 dated Jun. 10, 2010 (1 page).
European Search Report for Application No. 058255728.1 dated Dec. 12, 2009 (8 pages).
Examination Report from Australian Patent Office for Application No. 2005322833 dated Dec. 3, 2008 (2 pages).
Examination Report from Australian Patent Office for Application No. 2005322959 dated Nov. 13, 2008 (1 page).
Examination Report from Australian Patent Office for Application No. 2006203872 dated Oct. 13, 2008 (2 pages).
Final Office Action issued in related U.S. Appl. No. 11/317,295, mailed Aug. 16, 2010, 35 pgs.
Final Office Action issued in related U.S. Appl. No. 11/318,151, mailed Jan. 27, 2010, 30 pgs.
Final Office Action issued in related U.S. Appl. No. 11/327,526, mailed Mar. 24, 2010, 27 pgs.
First Office Action from Chinese Patent Office for Application No. 200580046093.0 dated Sep. 25, 2009 (5 pages).
First Office Action from Chinese Patent Office for Application No. 200580046094.5 dated Jan. 16, 2009 (6 pages).
First Office Action from Chinese Patent Office for Application No. 200580046095.X dated Mar. 6, 2009 (5 pages).
First Office Action from Chinese Patent Office for Application No. 200580046101.1 dated Feb. 27, 2009 (6 pages).
Non-Final Office Action issued in related U.S. Appl. No. 11/317,280, mailed Nov. 17, 2009, 19 pgs.
Non-Final Office Action issued in related U.S. Appl. No. 11/317,295, mailed Jun. 8, 2009, 19 pgs.
Non-Final Office Action issued in related U.S. Appl. No. 11/318,151, mailed Mar. 31, 2009, 21 pgs.
Non-Final Office Action issued in related U.S. Appl. No. 11/327,526, mailed Apr. 1, 2009, 27 pgs.
Office Action from Canadian Patent Office for Application No. 2,594,036 dated Jun. 2, 2009 (4 pages).
Office Action from Canadian Patent Office for Application No. 2,594,267 dated Jun. 2, 2009 (14 pages).
Office Action from Canadian Patent Office for Application No. 2,594,267 dated Jun. 2, 2009 (4 pages).
Office action from Japanese Patent for Application No. 2007-550402 dated Jun. 15, 2010 (3 pages).
Office action from Japanese Patent for Application No. 2007-550403 dated Mar. 16, 2010 (2 pages).
Office action from Japanese Patent for Application No. 2007-550404 dated Dec. 8, 2009 (3 pages).
Office action from Japanese Patent for Application No. 2007-550409 dated Jun. 15, 2010 (5 pages).
Office action from Japanese Patent for Application No. 2007-550501 dated Apr. 20, 2010 (2 pages).
Restriction Requirement issued in related U.S. Appl. No. 11/317,280, mailed May 22, 2009, 7 pgs.
Restriction Requirement issued in related U.S. Appl. No. 11/317,295, mailed Jan. 12, 2010, 8 pgs.
Restriction Requirement issued in related U.S. Appl. No. 11/318,151, mailed Nov. 28, 2008, 11 pgs.
Second Office Action from Chinese Patent Office for Application No. 200580046094.5 dated Feb. 12, 2010 (7 pages).
Second Office Action from Chinese Patent Office for Application No. 200580046101.1 dated Apr. 13, 2010 (19 pages).
Second Office Action from Chinese Patent Office for Application No. 200680001895.4 dated Aug. 28, 2009 (10 pages).
Telephone Office Action from Chinese Patent Office for Application No. 200580046095.X dated Aug. 11, 2009 (2 pages).
Third Office Action from Chinese Patent Office for Application No. 200680001895.4 dated Mar. 29, 2010 (8 pages).
Written Opinion for Application No. PCT/US05/47189 dated Sep. 24, 2007 (4 pages).
Non-Final Office Action in related U.S. Appl. No. 11/317,295, mailed Apr. 12, 2011, 22 pgs.
Non-Final Office Action in related U.S. Appl. No. 11/318,151, mailed Feb. 15, 2011, 12 pgs.
Written Opinion of the International Searching Authority, PCT/US2005/047189, dated Oct. 23, 2007.
English Translation of the First Office Action from Chinese Patent Office for Application No. 200680001895.4, dated Nov. 7, 2008, 7 pgs.
Office Action for Canadian Patent Application No. 2,594,119, dated Jun. 2, 2009, 4 pages.

Office Action for Canadian Patent Application No. 2,594,082, dated Jun. 4, 2009, 2 pages.
Written Opinon for PCT Application No. PCT/US2006/000477, mailed Sep. 21, 2007, 6 pages.
Examination Report for Australian Patent Application No. 2005322969 dated Nov. 14, 2008, 1 page.
Examination Report for Australian Patent Application No. 2005322970 dated Oct. 21, 2008, 2 pgs.
Examination Report for Indian Patent Application No. 3453/CHENP/2007 dated Jun. 2011, 3 pgs.
Examination Report for Indian Patent Application No. 3458/CHENP/2007 dated Jun. 2011, 2 pgs.
Examination Report for Indian Patent Application No. 3425/CHENP/2007 dated Jun. 2011, 3 pgs.
Examination Report for Indian Patent Application No. 3452/CHENP/2007 dated Jun. 2011, 2 pgs.
Second Office Action for Chinese Patent Application No. 200580046095.X dated Jun. 22, 2011, 19 pages.

* cited by examiner

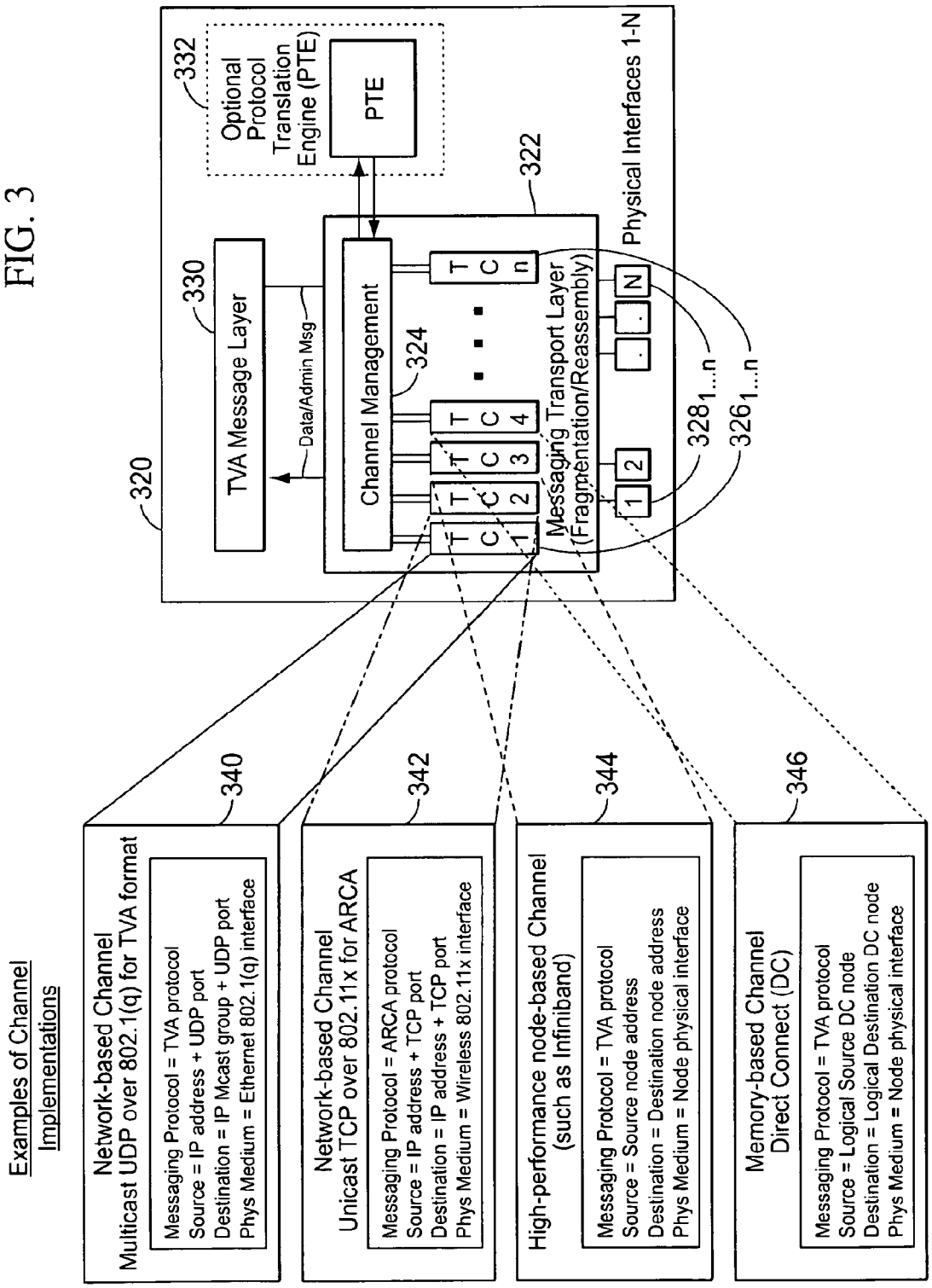

SYSTEMS AND METHODS FOR NETWORK VIRTUALIZATION

CROSS-REFERENCE TO RELATED APPLICATIONS

This application claims the benefit of and priority to U.S. Provisional Patent Application No. 60/641,988 filed Jan. 6, 2005, U.S. Provisional Patent Application No. 60/688,983 filed Jun. 8, 2005, and U.S. patent application Ser. No. 11/316,778, filed Dec. 23, 2005, the complete disclosures of all of which are incorporated by reference herein.

FIELD OF THE INVENTION

The present invention relates to data messaging and more particularly to middleware architecture of publish/subscribe systems.

BACKGROUND

The increasing level of performance required by data messaging infrastructures provides a compelling rationale for advances in networking infrastructure and protocols. Fundamentally, data distribution involves various sources and destinations of data, as well as various types of interconnect architectures and modes of communications between the data sources and destinations. Examples of existing data messaging architectures include hub-and-spoke, peer-to-peer and store-and-forward.

With the hub-and-spoke system configuration, all communications are transported through the hub, often creating performance bottlenecks when processing high volumes. Therefore, this messaging system architecture produces latency. One way to work around this bottleneck is to deploy more servers and distribute the network load across these different servers. However, such architecture presents scalability and operational problems. By comparison to a system with the hub-and-spoke configuration, a system with a peer-to-peer configuration creates unnecessary stress on the applications to process and filter data and is only as fast as its slowest consumer or node. Then, with a store-and-forward system configuration, in order to provide persistence, the system stores the data before forwarding it to the next node in the path. The storage operation is usually done by indexing and writing the messages to disk, which potentially creates performance bottlenecks. Furthermore, when message volumes increase, the indexing and writing tasks can be even slower and thus, can introduces additional latency.

Existing data messaging architectures share a number of deficiencies. One common deficiency is that data messaging in existing architectures relies on software that resides at the application level. This implies that the messaging infrastructure experiences OS (operating system) queuing and network I/O (input/output), which potentially create performance bottlenecks. Another common deficiency is that existing architectures use data transport protocols statically rather than dynamically even if other protocols might be more suitable under the circumstances. A few examples of common protocols include routable multicast, broadcast or unicast. Indeed, the application programming interface (API) in existing architectures is not designed to switch between transport protocols in real time.

Also, network configuration decisions are usually made at deployment time and are usually defined to optimize one set of network and messaging conditions under specific assumptions. The limitations associated with static (fixed) configuration preclude real time dynamic network reconfiguration. In other words, existing architectures are configured for a specific transport protocol which is not always suitable for all network data transport load conditions and therefore existing architectures are often incapable of dealing, in real-time, with changes or increased load capacity requirements.

Furthermore, when data messaging is targeted for particular recipients or groups of recipients, existing messaging architectures use routable multicast for transporting data across networks. However, in a system set up for multicast there is a limitation on the number of multicast groups that can be used to distribute the data and, as a result, the messaging system ends up sending data to destinations which are not subscribed to it (i.e., consumers which are not subscribers). This increases consumers' data processing load and discard rate due to data filtering. Then, consumers that become overloaded for any reason and cannot keep up with the flow of data eventually drop incoming data and later ask for retransmissions. Retransmissions affect the entire system in that all consumers receive the repeat transmissions and all of them re-process the incoming data. Therefore, retransmissions can cause multicast storms and eventually bring the entire networked system down.

When the system is set up for unicast messaging as a way to reduce the discard rate, the messaging system may experience bandwidth saturation because of data duplication. For instance, if more than one consumer subscribes to a given topic of interest, the messaging system has to deliver the data to each subscriber, and in fact it sends a different copy of this data to each subscriber. And, although this solves the problem of consumers filtering out non-subscribed data, unicast transmission is non-scalable and thus not adaptable to substantially large groups of consumers subscribing to a particular data or to a significant overlap in consumption patterns.

One more common deficiency of existing architectures is their slow and often high number of protocol transformations. The reason for this is the IT (information technology) band-aid strategy in the Enterprise Application Integration (EIA) domain, where more and more new technologies are integrated with legacy systems.

Hence, there is a need to improve data messaging systems performance in a number of areas. Examples where performance might need improvement are speed, resource allocation, latency, and the like.

SUMMARY OF THE INVENTION

The present invention is based, in part, on the foregoing observations and on the idea that such deficiencies can be addressed with better results using a different approach. These observations gave rise to the end-to-end message publish/subscribe architecture for high-volume and low-latency messaging. So therefore, a data distribution system with an end-to-end message publish/subscribe architecture in accordance with the principles of the present invention can advantageously route significantly higher message volumes with significantly lower latency by, among other things, reducing intermediary hops with neighbor-based routing and network disintermediation, introducing efficient native-to-external and external-to-native protocol conversions, monitoring system performance, including latency, in real time, employing topic-based and channel-based message communications, and dynamically and intelligently optimizing system interconnect configurations and message transmission protocols. In addition, such system can provide guaranteed delivery quality of service with data caching.

In connection with resource allocation, a data distribution system in accordance with the present invention produces the advantage of dynamically allocating available resources in real time. To this end, instead of the conventional static configuration approach the present invention contemplates a system with real-time, dynamic, learned approach to resource allocation. Examples where resource allocation can be optimized in real time include network resources (usage of bandwidth, protocols, paths/routes) and consumer system resources (usage of CPU, memory, disk space).

In connection with monitoring system topology and performance, a data distribution system in accordance with the present invention advantageously distinguishes between message-level and frame-level latency measurements. In certain cases, the correlation between these measurements provides a competitive business advantage. In other words, the nature and extent of latency may indicate best data and source of data which, in turn, may be useful in business processes and provide a competitive edge.

Thus, in accordance with the purpose of the invention as shown and broadly described herein one exemplary system with a publish/subscribe middleware architecture includes: one or more than one messaging appliance configured for receiving and routing messages; an interconnect; and a provisioning and management system linked via the interconnect and configured for exchanging administrative messages with each messaging appliance. In such system, the messaging appliance executes the routing of messages by dynamically selecting a message transmission protocol and a message routing path.

In addition, the publish/subscribe system can be centrally monitored and configured from the provisioning and management system. This provides a manageable and scalable single-point configuration for entitlements, user management, digital rights management, schemas, etc.

Moreover, the foregoing system can be implemented with one or more namespace domains, and, if indeed more than one space domain exists, the system further includes a domain interconnect medium for connecting between the namespace domains. This domain interconnect medium can be, for instance, any networking infrastructure.

In yet another embodiment, an enterprise system with a publish/subscribe middleware architecture includes: a market data delivery infrastructure having one or more messaging appliances for receiving and routing market data messages; a market order routing infrastructure having one or more messaging appliances for receiving and routing transaction order messages; and an intermediate infrastructure in communication link with the market data delivery and market order routing infrastructures, respectively. In this system, the intermediary infrastructure includes one or more than one messaging appliance configured for receiving and routing the market data and transaction order messages, an interconnect, and a provisioning and management system linked via the interconnect and configured for exchanging administrative messages with each messaging appliance, including the messaging appliances in the market data delivery and market order routing infrastructures. Again, each of the messaging appliances is further configured for executing the routing of messages it receives by dynamically selecting a message transmission protocol and a message routing path.

Moreover, in such enterprise system there are market data sources for publishing the market data messages and market data consumers (external data destinations) for receiving the market data messages and for publishing the transaction order messages. The market data consumers include one or more applications. Therefore, the intermediate infrastructure includes an application programming interface between each of the applications and one of the messaging appliances in the intermediate infrastructure to which such application programming interface is registered. The application programming interfaces are operative for delivering the market data messages to the applications and transaction order messages from the applications. This system further includes protocol transformation engines for translating between native and external message protocols of incoming and outgoing message, respectively.

In sum, these and other features, aspects and advantages of the present invention will become better understood from the description herein, appended claims, and accompanying drawings as hereafter described.

BRIEF DESCRIPTION OF THE DRAWINGS

The accompanying drawings which are incorporated in and constitute a part of this specification illustrate various aspects of the invention and together with the description, serve to explain its principles. Wherever convenient, the same reference numbers will be used throughout the drawings to refer to the same or like elements.

FIG. 3 illustrates a channel-based messaging system architecture.

DETAILED DESCRIPTION

Figure 1:
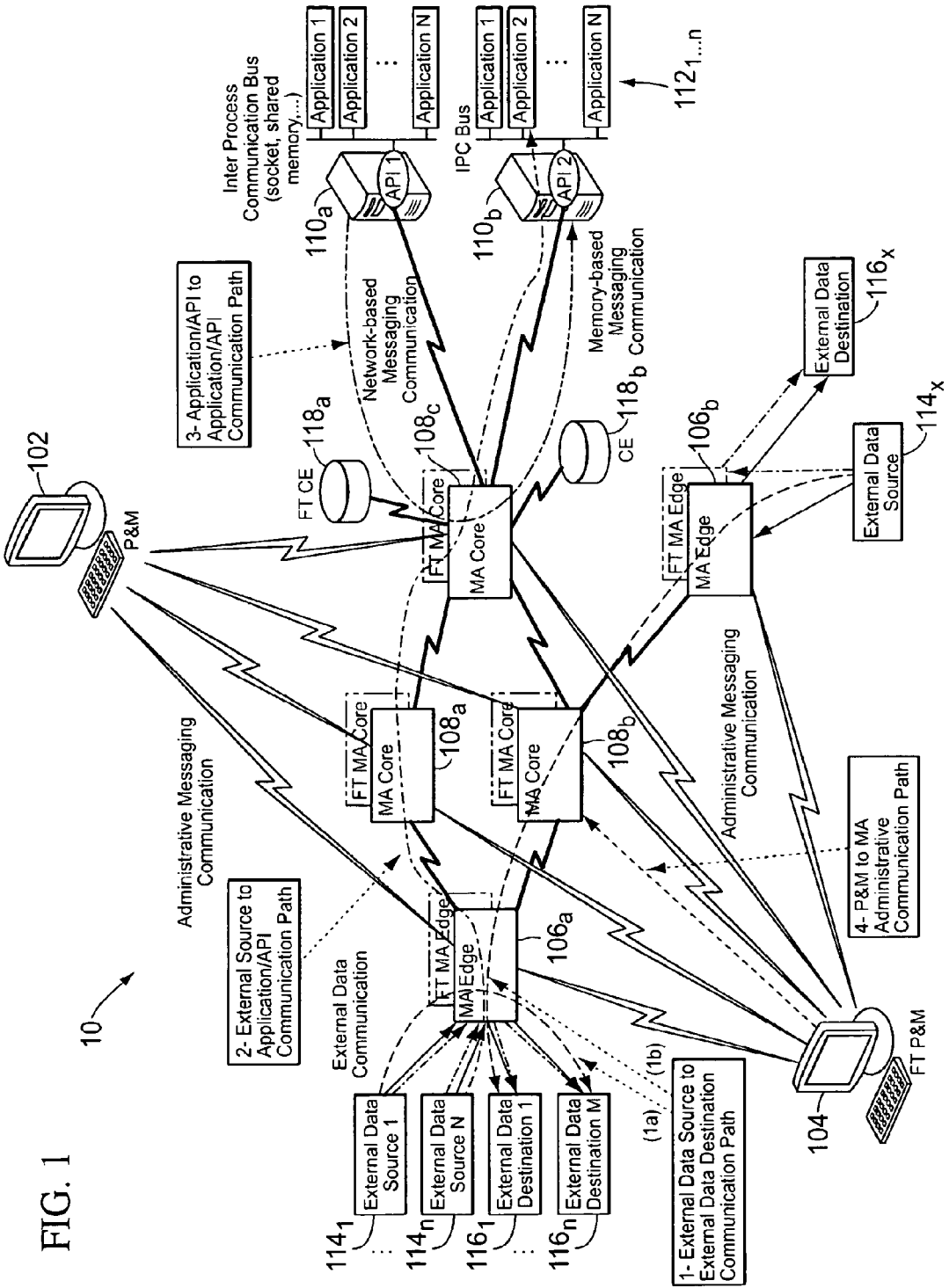
FIG. 1 illustrates an end-to-end middleware architecture in accordance with the principles of the present invention.

Before outlining the details of various embodiments in accordance with aspects and principles of the present invention the following is a brief explanation of some terms that may be used throughout this description. It is noted that this explanation is intended to merely clarify and give the reader an understanding of how such terms might be used, but without limiting these terms to the context in which they are used and without limiting the scope of the claims thereby.

The term "middleware" is used in the computer industry as a general term for any programming that mediates between two separate and often already existing programs. Typically, middleware programs provide messaging services so that different applications can communicate. The systematic tying together of disparate applications, often through the use of middleware, is known as enterprise application integration (EAI). In this context, however, "middleware" can be a broader term used in the context of messaging between source and destination and the facilities deployed to enable such messaging; and, thus, middleware architecture covers the networking and computer hardware and software components that facilitate effective data messaging, individually and in combination as will be described below. Moreover, the terms "messaging system" or "middleware system," can be used in the context of publish/subscribe systems in which messaging servers manage the routing of messages between publishers and subscribers. Indeed, the paradigm of publish/subscribe in messaging middleware is a scalable and thus powerful model.

The term "consumer" may be used in the context of client-server applications and the like. In one instance a consumer is a system or an application that uses an application programming interface (API) to register to a middleware system, to subscribe to information, and to receive data delivered by the middleware system. An API inside the middleware architecture boundaries is a consumer; and an external consumer is any publish/subscribe system (or external data destination) that doesn't use the API and for communications with which messages go through protocol transformation (as will be later explained).

The term "external data source" may be used in the context of data distribution and message publish/subscribe systems. In one instance, an external data source is regarded as a system or application, located within or outside the enterprise private network, which publishes messages in one of the common protocols or its own message protocol. An example of an external data source is a market data exchange that publishes stock market quotes which are distributed to traders via the middleware system. Another example of an external data source is transactional data. Note that in a typical implementation of the present invention, as will be later described in more detail, the middleware architecture adopts its unique native protocol to which data from external data sources is converted once it enters the middleware system domain, thereby avoiding multiple protocol transformations typical of conventional systems.

The term "external data destination" is also used in the context of data distribution and message publish/subscribe systems. An external data destination is, for instance, a system or application, located within or outside the enterprise private network, which is subscribing to information routed via a local/global network. One example of an external data destination could be the aforementioned market data exchange that handles transaction orders published by the traders. Yet another embodiment of the external data destination is transactional data. Note that, in the foregoing middleware architecture messages directed to an external data destination are translated from the native protocol to the external protocol associated with the external data destination.

As can be ascertained from the description herein, the present invention can be practiced in various ways with various configurations, each embodying a middleware architecture. An example of an end-to-end middleware architecture in accordance with the principles of the present invention is shown in FIG. 1.

This exemplary architecture combines a number of beneficial features which include: messaging common concepts, APIs, fault tolerance, provisioning and management (P&M), quality of service (QoS—conflated, best-effort, guaranteed-while-connected, guaranteed-while-disconnected etc.), persistent caching for guaranteed delivery QoS, management of namespace and security service, a publish/subscribe ecosystem (core, ingress and egress components), transport-transparent messaging, neighbor-based messaging (a model that is a hybrid between hub-and-spoke, peer-to-peer, and store-and-forward, and which uses a subscription-based routing protocol that can propagate the subscriptions to all neighbors as necessary), late schema binding, partial publishing (publishing changed information only as opposed to the entire data) and dynamic allocation of network and system resources. As will be later explained, the publish/subscribe system advantageously incorporates a fault tolerant design of the middleware architecture. Note that the core MAs portion of the publish/subscribe ecosystem uses the aforementioned native messaging protocol (native to the middleware system) while the ingress and egress portions, the edge MAs, translate to and from this native protocol, respectively.

In addition to the publish/subscribe system components, the diagram of FIG. 1 shows the logical connections and communications between them. As can be seen, the illustrated middleware architecture is that of a distributed system. In a system with this architecture, a logical communication between two distinct physical components is established with a message stream and associated message protocol. The message stream contains one of two categories of messages: administrative and data messages. The administrative messages are used for management and control of the different physical components, management of subscriptions to data, and more. The data messages are used for transporting data between sources and destinations, and in a typical publish/subscribe messaging there are multiple senders and multiple receivers of data messages.

With the structural configuration and logical communications as illustrated the distributed publish/subscribe system with the middleware architecture is designed to perform a number of logical functions. One logical function is message protocol translation which is advantageously performed at an edge messaging appliance (MA) component. A second logical function is routing the messages from publishers to subscribers. Note that the messages are routed throughout the publish/subscribe network. Thus, the routing function is performed by each MA where messages are propagated, say, from an edge MA $106a$-$b$ (or API) to a core MA $108a$-$c$ or from one core MA to another core MA and eventually to an edge MA (e.g., $106b$) or API $110a$-$b$. The API $110a$-$b$ communicates with applications $112_{1-n}$ via an inter-process communication bus (sockets, shared memory etc.).

A third logical function is storing messages for different types of guaranteed-delivery quality of service, including for instance guaranteed-while-connected and guaranteed-while-disconnected. A fourth function is delivering these messages to the subscribers. As shown, an API $106a$-$b$ delivers messages to subscribing applications $112_{1-n}$.

In this publish/subscribe middleware architecture, the system configuration function as well as other administrative and system performance monitoring functions are managed by the P&M system. Additionally, the MAs are deployed as edge MAs or core MAs, depending on their role in the network. An edge MA is similar to a core MA in most respects, except that it includes a protocol translation engine that transforms messages from external to native protocols and from native to external protocols. Thus, in general, the boundaries of the publish/subscribe system middleware architecture are characterized by its edges at which there are edge MAs 106a-b and APIs 110a-b; and within these boundaries there are core MAs 108a-c.

In a typical system, the core MAs 108a-c route the published messages internally within the system towards the edge MAs or APIs (e.g., APIs 110a-b). The routing map, particularly in the core MAs, is designed for maximum volume, low latency, and efficient routing. Moreover, the routing between the core MAs can change dynamically in real-time. For a given messaging path that traverses a number of nodes (core MAs), a real time change of routing is based on one or more metrics, including network utilization, overall end-to-end latency, communications volume, network delay, loss and jitter.

Alternatively, instead of dynamically selecting the best performing path out of two or more diverse paths, the MA can perform multi-path routing based on message replication and thus send the same message across all paths. All the MAs located at convergence points of diverse paths will drop the duplicated messages and forward only the first arrived message. This routing approach has the advantage of optimizing the messaging infrastructure for low latency; although the drawback of this routing method is that the infrastructure requires more network bandwidth to carry the duplicated traffic.

Note that the system architecture is not confined to a particular limited geographic area and, in fact, is designed to transcend regional or national boundaries and even span across continents. In such cases, the edge MAs in one network can communicate with the edge MAs in another geographically distant network via existing networking infrastructures.

The edge MAs have the ability to convert any external message protocol of incoming messages to the middleware system's native message protocol; and from native to external protocol for outgoing messages. That is, an external protocol is converted to the native (e.g., Tervela™) message protocol when messages are entering the publish/subscribe network domain (ingress); and the native protocol is converted into the external protocol when messages exit the publish/subscribe network domain (egress). Another function of edge MAs is to deliver the published messages to the subscribing external data destinations.

Additionally, both the edge and the core MAs 106a-b and 108a-c are capable of storing the messages before forwarding them. One way this can be done is with a caching engine (CE) 118a-b. One or more CEs can be connected to the same MA. Theoretically, the API is said not to have this store-and-forward capability although in reality an API 110a-b could store messages before delivering them to the application, and it can store messages received from applications before delivering them to a core MA, edge MA or another API.

When an MA (edge or core MA) has an active connection to a CE, it forwards all or a subset of the routed messages to the CE which writes them to a storage area for persistency. For a predetermined period of time, these messages are then available for retransmission upon request. Examples where this feature is implemented are data replay, partial publish and various quality of service levels. Partial publish is effective in reducing network and consumers load because it requires transmission only of updated information rather than of all information.

To illustrate how the routing maps might effect routing, a few examples of the publish/subscribe routing paths are shown in FIG. 1. In this illustration, the middleware architecture of the publish/subscribe network provides five or more different communication paths between publishers and subscribers.

The first communication path links an external data source to an external data destination. The published messages received from the external data source $114_{1-n}$ are translated into the native (e.g., Tervela™) message protocol and then routed by the edge MA 106a. One way the native protocol messages can be routed from the edge MA 106a is to an external data destination 116n. This path is called out as communication path 1a. In this case, the native protocol messages are converted into the external protocol messages suitable for the external data destination. Another way the native protocol messages can be routed from the edge MA 106b is internally through a core MA 108b. This path is called out as communication path 1b. Along this path, the core MA 108b routes the native messages to an edge MA 106a. However, before the edge MA 106a routes the native protocol messages to the external data destination $116_1$, it converts them into an external message protocol suitable for this external data destination $116_1$. As can be seen, this communication path doesn't require the API to route the messages from the publishers to the subscribers. Therefore, if the publish/subscribe system is used for external source-to-destination communications, the system need not include an API.

Another communication path, called out as communications path 2, links an external data source 114n to an application using the API 110b. Published messages received from the external data source are translated at the edge MA 106a into the native message protocol and are then routed by the edge MA to a core MA 108a. From the first core MA 108a, the messages are routed through another core MA 108c to the API 110b. From the API the messages are delivered to subscribing applications (e.g., $112_2$). Because the communication paths are bidirectional, in another instance, messages could follow a reverse path from the subscribing applications $112_{1-n}$ to the external data destination 116n. In each instance, core MAs receive and route native protocol messages while edge MAs receive external or native protocol messages and, respectively, route native or external protocol messages (edge MAs translate to/from such external message protocol to/from the native message protocol). Each of the edge MAs can route an ingress message simultaneously to both native protocol channels and external protocol channels. As a result, each edge MA can route an ingress message simultaneously to both external and internal consumers, where internal consumers consume native protocol messages and external consumers consume external protocol messages. This capability enables the messaging infrastructure to seamlessly and smoothly integrate with legacy applications and systems.

Yet another communication path, called out as communications path 3, links two applications, both using an API 110a-b. At least one of the applications publishes messages or subscribes to messages. The delivery of published messages to (or from) subscribing (or publishing) applications is done via an API that sits on the edge of the publish/subscribe network. When applications subscribe to messages, one of the core or edge MAs routes the messages towards the API which, in turn, notifies the subscribing applications when the data is ready to be delivered to them. Messages published from an application are sent via the API to the core MA 108c to which the API is 'registered'.

Note that by 'registering' (logging in) to an MA, the API becomes logically connected to it. An API initiates the connection to the MA by sending a registration (a 'log-in' request) message to the MA. After registration, the API can subscribe to particular topics of interest by sending its subscription messages to the MA. Topics are used for publish/subscribe messaging to define shared access domains and the targets for a message, and therefore a subscription to one or more topics permits reception and transmission of messages with such topic notations. The P&M sends to the MAs in the network periodic entitlement updates and each MA updates its own table accordingly. Hence, if the MA find the API to be entitled to subscribe to a particular topic (the MA verifies the API's entitlements using the routing entitlements table) the MA activates the logical connection to the API. Then, if the API is properly registered with it, the core MA 108c routes the data to the second API 110 as shown. In other instances this core MA 108b may route the messages through additional one or more core MAs (not shown) which route the messages to the API 110b that, in turn, delivers the messages to subscribing applications $112_{1-n}$.

As can be seen, communications path 3 doesn't require the presence of an edge MA, because it doesn't involve any external data message protocol. In one embodiment exemplifying this kind of communications path, an enterprise system is configured with a news server that publishes to employees the latest news on various topics. To receive the news, employees subscribe to their topics of interest via a news browser application using the API.

Note that the middleware architecture allows subscription to one or more topics. Moreover, this architecture allows subscription to a group of related topics with a single subscription request, by allowing wildcards in the topic notation.

Yet another path, called out as communications path 4, is one of the many paths associated with the P&M system 102 and 104 with each of them linking the P&M to one of the MAs in the publish/subscribe network middleware architecture. The messages going back and forth between the P&M system and each MA are administrative messages used to configure and monitor that MA. In one system configuration, the P&M system communicates directly with the MAs. In another system configuration, the P&M system communicates with MAs through other MAs. In yet another configuration the P&M system can communicate with the MAs both directly or indirectly.

Figure 1A:
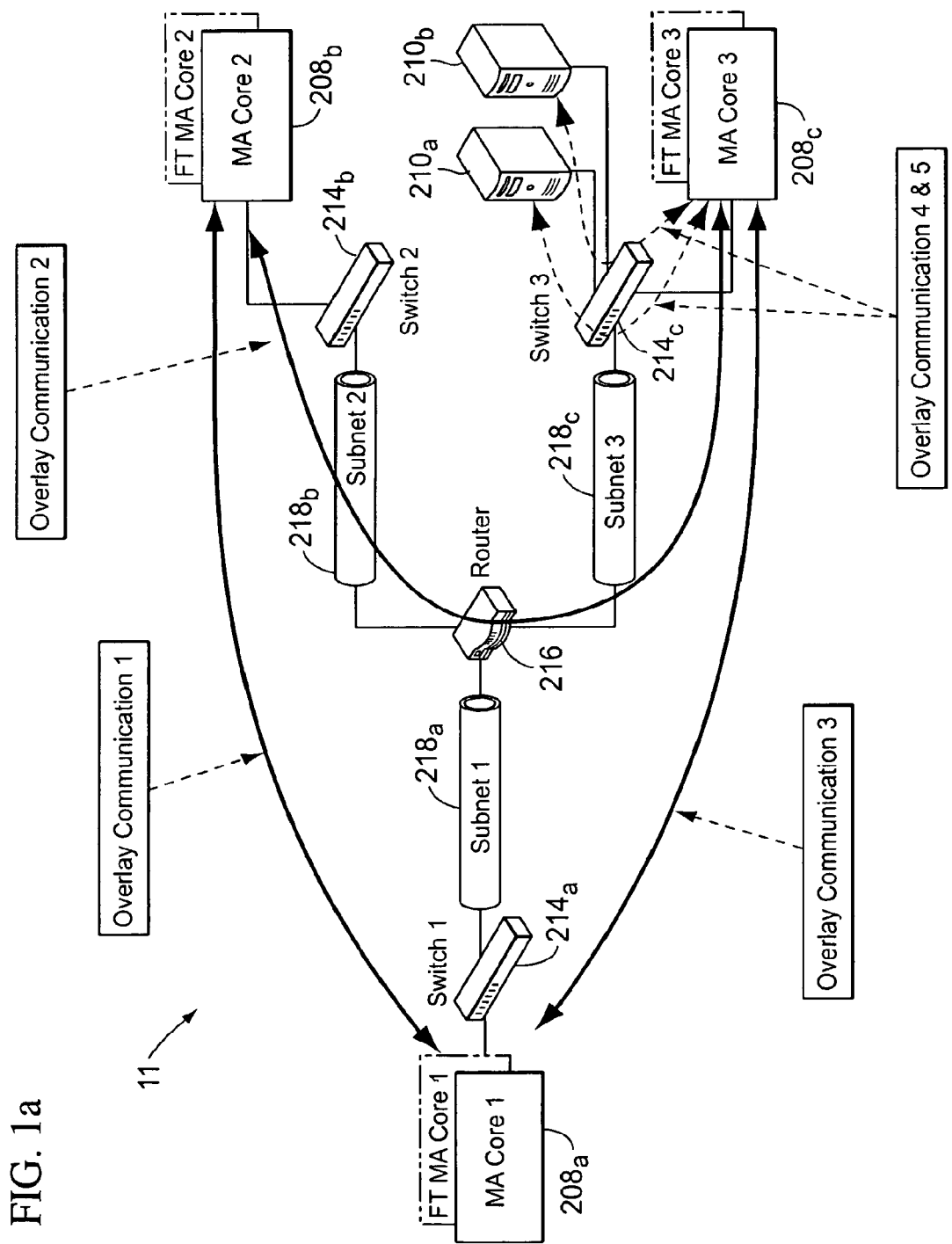
FIG. 1a is a diagram illustrating an overlay network.

In a typical implementation, the middleware architecture can be deployed over a network with switches, router and other networking appliances, and it employs channel-based messaging capable of communications over any type of physical medium. One exemplary implementation of this fabric-agnostic channel-based messaging is an IP-based network. In this environment, all communications between all the publish/subscribe physical components are performed over UDP (User Datagram Protocol), and the transport reliability is provided by the messaging layer. An overlay network according to this principle is illustrated in FIG. 1a.

As shown, overlay communications 1, 2 and 3 can occur between the three core MAs 208a-c via switches 214a-c, a router 216 and subnets 218a-c. In other words, these communication paths can be established on top of the underlying network which is composed of networking infrastructure such as subnets, switches and routers, and, as mentioned, this architecture can span over a large geographic area (different countries and even different continents).

Figure 2:
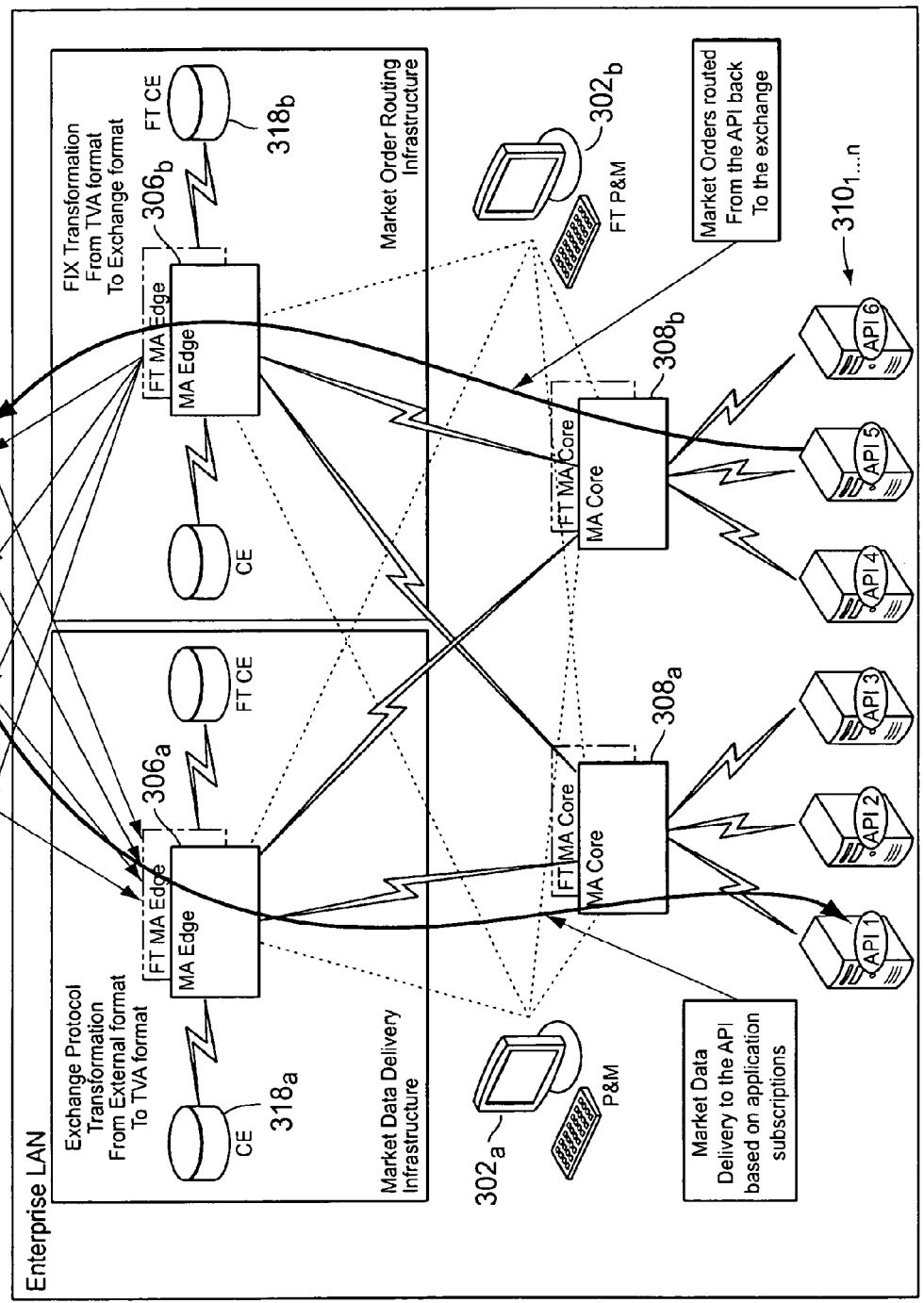
FIG. 2 is a diagram illustrating an enterprise infrastructure implemented with an end-to-end middleware architecture according to the principles of the present invention.

Notably, the foregoing and other end-to-end middleware architectures according to the principles of the present invention can be implemented in various enterprise infrastructures in various business environments. One such implementation is illustrated on FIG. 2.

In this enterprise infrastructure, a market data distribution plant 12 is built on top of the publish/subscribe network for routing stock market quotes from the various market data exchanges $320_{1-n}$ to the traders (applications not shown). Such an overlay solution relies on the underlying network for providing interconnects, for instance, between the MAs as well as between such MAs and the P&M system. Market data delivery to the APIs $310_{1-n}$ is based on applications subscription. With this infrastructure, traders using the applications (not shown) can place transaction orders that are routed from the APIs $310_{1-n}$ through the publish/subscribe network (via core MAs 308a-b and the edge MA 306b) back to the market data exchanges $320_{1-n}$.

Figure 2A:
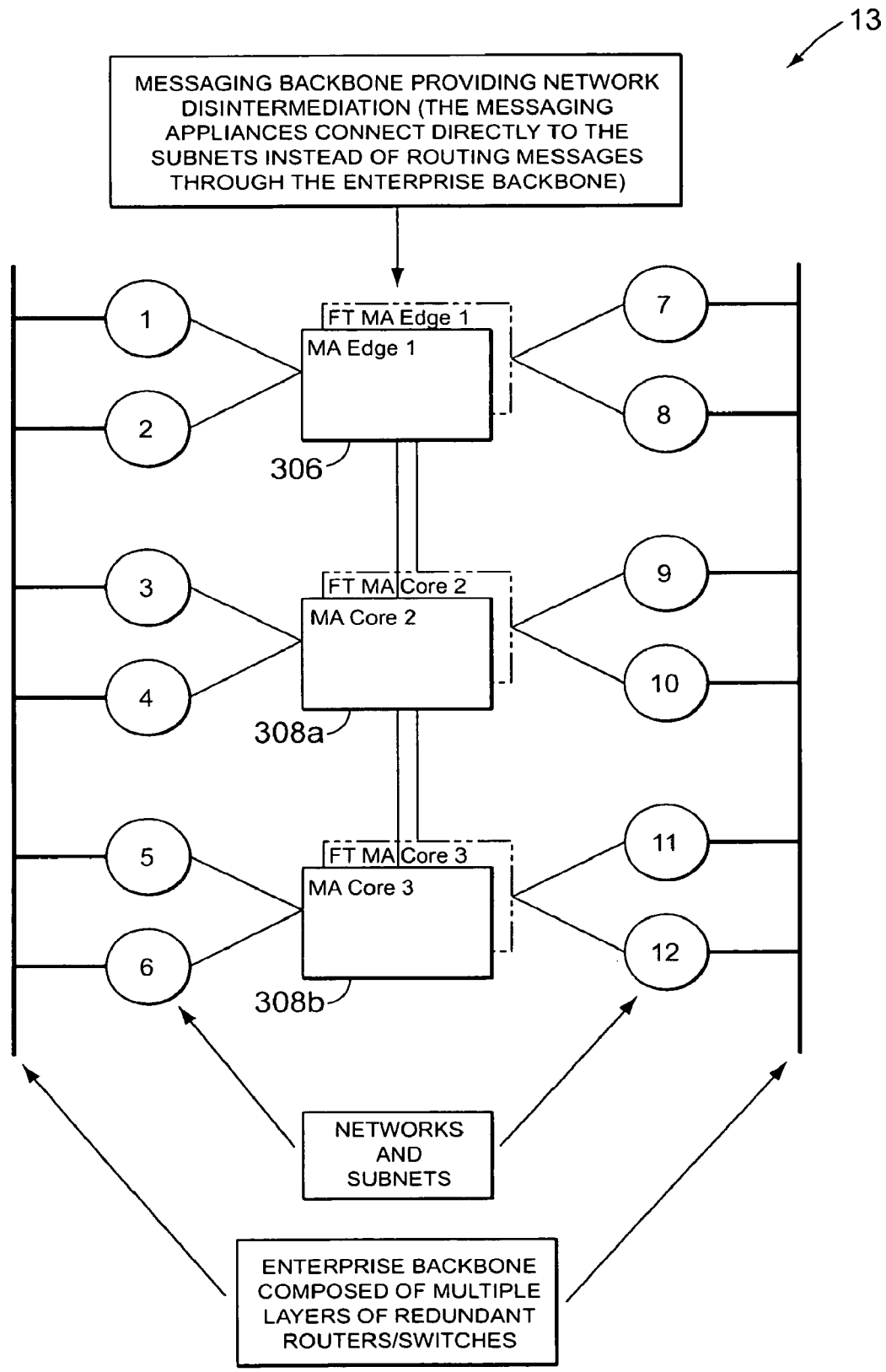
FIG. 2a is a diagram illustrating an enterprise infrastructure physical deployment with the message appliances (MAs) creating a network backbone disintermediation.

An example of the underlying physical deployment is illustrated on FIG. 2a. As shown, the MAs are directly connected to each other and plugged directly into the networks and subnets in which the consumers and publishers of messaging traffic are physically connected. In this case, interconnects would be the direct connections, say, between the MAs as well as between them and the P&M system. This enables a network backbone disintermediation and a physical separation of the messaging traffic from other enterprise applications traffic. Effectively, the MAs can be used to remove the reliance on traditional routed network for the messaging traffic.

In this example of physical deployment, the external data sources or destinations, such as market data exchanges, are directly connected to edge MAs, for instance edge MA 1. The consuming or publishing applications of messaging traffic, such as market trading applications, are connected to the subnets 1-12. These applications have at least two ways to subscribe, publish or communicate with other applications. The application could either use the enterprise backbone, composed of multiple layers of redundant routers and switches, which carries all enterprise application traffic, such as messaging traffic, or use the messaging backbone, composed of edge and core MAs directly interconnected to each other via an integrated switch. Using an alternative backbone has the benefit of isolating the messaging traffic from other enterprise application traffic, and thus better controlling the performance of the messaging traffic. In one implementation, an application located in subnet 6 logically or physically connected to the core MA 3, subscribes to or publishes messaging traffic in the native protocol, using the Tervela API. In another implementation, an application located in subnet 7 logically or physically connected to the edge MA 1, subscribes to or publishes the messaging traffic in an external protocol, where the MA performs the protocol transformation using the integrated protocol transformation engine module.

Logically, the physical components of the publish/subscribe network are built on a messaging transport layer akin to layers 1 to 4 of the Open Systems Interconnection (OSI) reference model. Layers 1 to 4 of the OSI model are respectively the Physical, Data Link, Network and Transport layers.

Thus, in one embodiment of the invention, the publish/subscribe network can be directly deployed into the underlying network/fabric by, for instance, inserting one or more messaging line card in all or a subset of the network switches and routers. In another embodiment of the invention, the publish/subscribe network can be deployed as a mesh overlay network (in which all the physical components are connected to each other). For instance, a fully-meshed network of 4 MAs is a network in which each of the MAs is connected to each of its 3 peer MAs. In a typical implementation, the publish/subscribe network is a mesh network of one or more external data sources and/or destinations, one or more provisioning and management (P&M) systems, one or more messaging appliances (MAs), one or more optional caching engines (CE) and one or more optional application programming interfaces (APIs).

As will be later explained in more detail, reliability, availability and consistency are often necessary in enterprise operations. For this purpose, the publish/subscribe system can be designed for fault tolerance with several of its components being deployed as fault tolerant systems. For instance, MAs can be deployed as fault-tolerant MA pairs, where the first MA is called the primary MA, and the second MA is called the secondary MA or fault-tolerant MA (FT MA). Again, for store and forward operations, the CE (cache engine) can be connected to a primary or secondary core/edge MA. When a primary or secondary MA has an active connection to a CE, it forwards all or a subset of the routed messages to that CE which writes them to a storage area for persistency. For a predetermined period of time, these messages are then available for retransmission upon request.

Notably, communications throughout the publish/subscribe network are conducted using the native protocol messages independently from the underlying transport logic. This is why we refer to this architecture as a transport-transparent channel-based messaging architecture.

FIG. 3 illustrate in more details the channel-based messaging architecture 320. Generally, each communication path between the messaging source and destination is considered a messaging transport channel. Each channel $326_{1-n}$, is established over a physical medium with interfaces $328_{1-n}$ between the channel source and the channel destination. Each such channel is established for a specific message protocol, such as the native (e.g., Tervela™) message protocol or others. Only edge MAs (those that manage the ingress and egress of the publish/subscribe network) use the channel message protocol (external message protocol). Based on the channel message protocol, the channel management layer 324 determines whether incoming and outgoing messages require protocol translation. In each edge MA, if the channel message protocol of incoming messages is different from the native protocol, the channel management layer 324 will perform a protocol translation by sending the message for process through the protocol translation engine (PTE) 332 before passing them along to the native message layer 330. Also, in each edge MA, if the native message protocol of outgoing messages is different from the channel message protocol (external message protocol), the channel management layer 324 will perform a protocol translation by sending the message for process through the protocol translation engine (PTE) 332 before routing them to the transport channel $326_{1-n}$. Hence, the channel manages the interface $328_{1-n}$ with the physical medium as well as the specific network and transport logic associated with that physical medium and the message reassembly or fragmentation.

In other words, a channel manages the OSI transport to physical layers 322. Optimization of channel resources is done on a per channel basis (e.g., message density optimization for the physical medium based on consumption patterns, including bandwidth, message size distribution, channel destination resources and channel health statistics). Then, because the communication channels are fabric agnostic, no particular type of fabric is required. Indeed, any fabric medium will do, e.g., ATM, Infiniband or Ethernet.

Incidentally, message fragmentation or re-assembly may be needed when, for instance, a single message is split across multiple frames or multiple messages are packed in a single frame Message fragmentation or reassembly is done before delivering messages to the channel management layer.

FIG. 3 further illustrates a number of possible channels implementations in a network with the middleware architecture. In one implementation 340, the communication is done via a network-based channel using multicast over an Ethernet switched network which serves as the physical medium for such communications. In this implementation the source send messages from its IP address, via its UDP port, to the group of destinations (defined as an IP multicast address) with its associated UDP port. In a variation of this implementation 342, the communication between the source and destination is done over an Ethernet switched network using UDP unicast. From its IP address, the source sends messages, via a UDP port, to a select destination with a UDP port at its respective IP address.

In another implementation 344, the channel is established over an Infiniband interconnect using a native Infiniband transport protocol, where the Infiniband fabric is the physical medium. In this implementation the channel is node-based and communications between the source and destination are node-based using their respective node addresses. In yet another implementation 346, the channel is memory-based, such as RDMA (Remote Direct Memory Access), and referred to here as direct connect (DC). With this type of channel, messages are sent from a source machine directly into the destination machine's memory, thus, bypassing the CPU processing to handle the message from the NIC to the application memory space, and potentially bypassing the network overhead of encapsulating messages into network packets.

As to the native protocol, one approach uses the aforementioned native Tervela™ message protocol. Conceptually, the Tervela™ message protocol is similar to an IP-based protocol. Each message contains a message header and a message payload. The message header contains a number of fields one of which is for the topic information. As mentioned, a topic is used by consumers to subscribe to a shared domain of information.

Figure 4A:
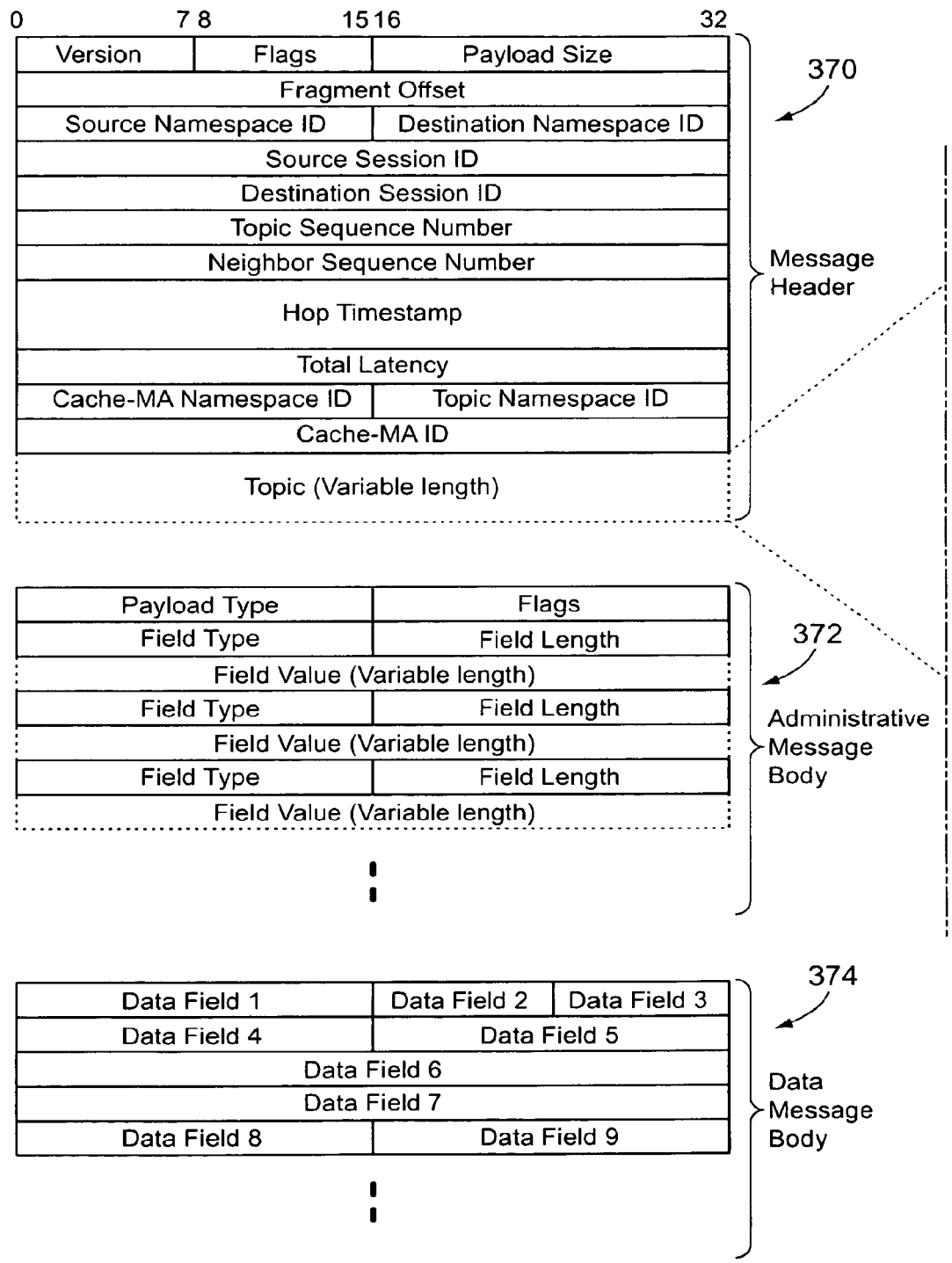
FIG. 4 illustrates one possible topic-based message format.
Figure 4B:
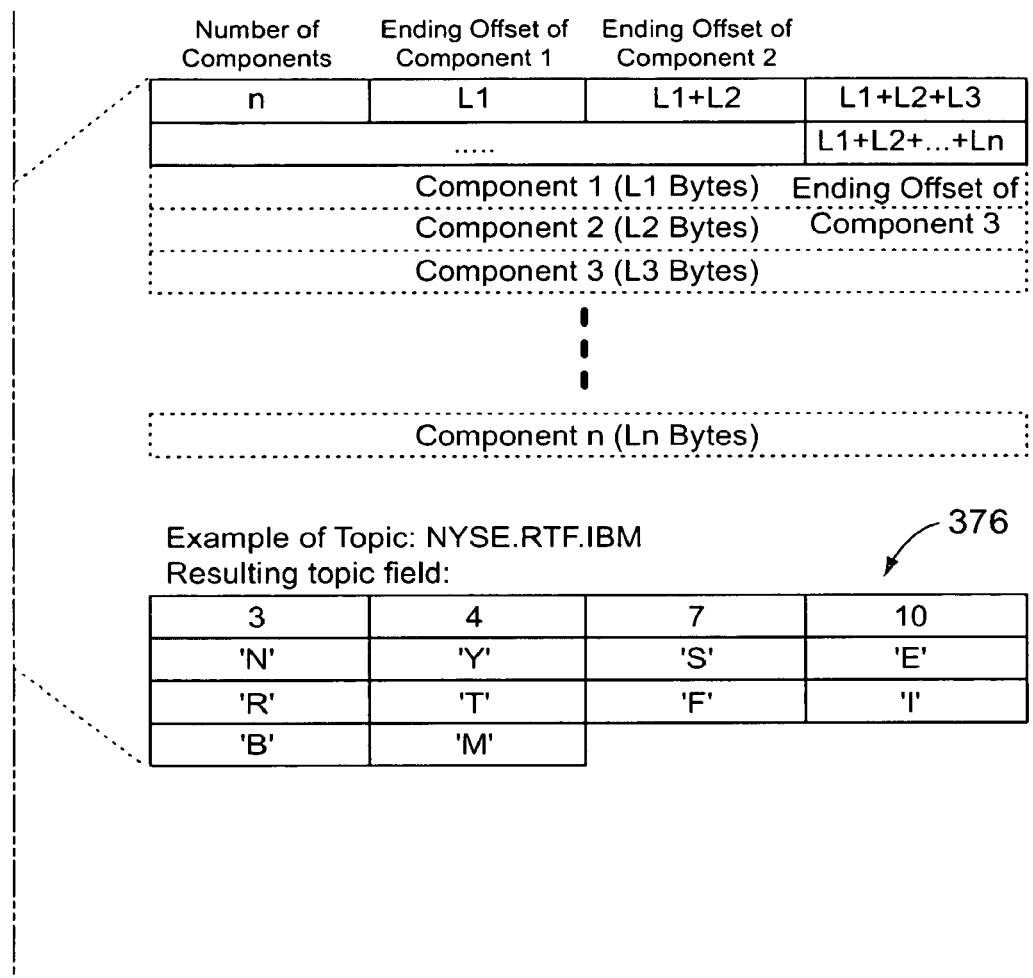

FIG. 4 illustrates one possible topic-based message format. As shown, messages include a header 370 and a body 372 and 374 which includes the payload. The two types of messages, data and administrative are shown with different message bodies and payload types. The header includes fields for the source and destination namespace identifications, source and destination session identifications, topic sequence number and hope timestamp; and, in addition, it includes the topic notation field (which is preferably of variable length). The topic might be defined as a token-based string, such as NYSE.RTF.IBM 376 which is the topic string for messages containing the real time quote of the IBM stock.

In some embodiment, the topic information in the message might be encoded or mapped to a key, which can be one or more integer values. Then, each topic would be mapped to a unique key, and the mapping database between topics and keys would be maintained by the P&M system and updated over the wire to all MAs. As a result, when an API subscribes or publishes to one topic, the MA is able to return the associated unique key that is used for the topic field of the message.

Preferably, the subscription format will follow the same format as the message topic. However, the subscription format also supports wildcards that match any topic substring or regular expression pattern-match against the topic. Handling of wildcard mapping to actual topics may be dependant on the P&M subsystem or handled by the MA depending on complexity of the wildcard or pattern-match request.

For instance, such pattern matching rules could be:

Example #1

A string with a wildcard of T1.*.T3.T4 would match T1.T2a.T3.T4 and T1.T2b.T3.T4 but would not match T1.T2.T3.T4.T5

Example #2

A string with wildcards of T1.*.T3.T4.* would not match T1.T2a.T3.T4 and T1.T2b.T3.T4 but it would match T1.T2.T3.T4.T5

Example #3

A string with wildcards of T1.*.T3.T4.[*] (optional 5$^{th}$ element) would match T1.T2a.T3.T4, T1.T2b.T3.T4 and T1.T2.T3.T4.T5 but would not match T1.T2.T3.T4.T5.T6

Example #4

A string with a wildcard of T1.T2*.T3.T4 would match T1.T2a.T3.T4 and T1.T2b.T3.T4 but would not match T1.T5a.T3.T4

Example #5

A string with wildcards of T1.*.T3.T4.> (any number of trailing elements) would match T1.T2a.T3.T4, T1.T2b.T3.T4, T1.T2.T3.T4.T5 and T1.T2.T3.T4.T5.T6.

Figure 5:
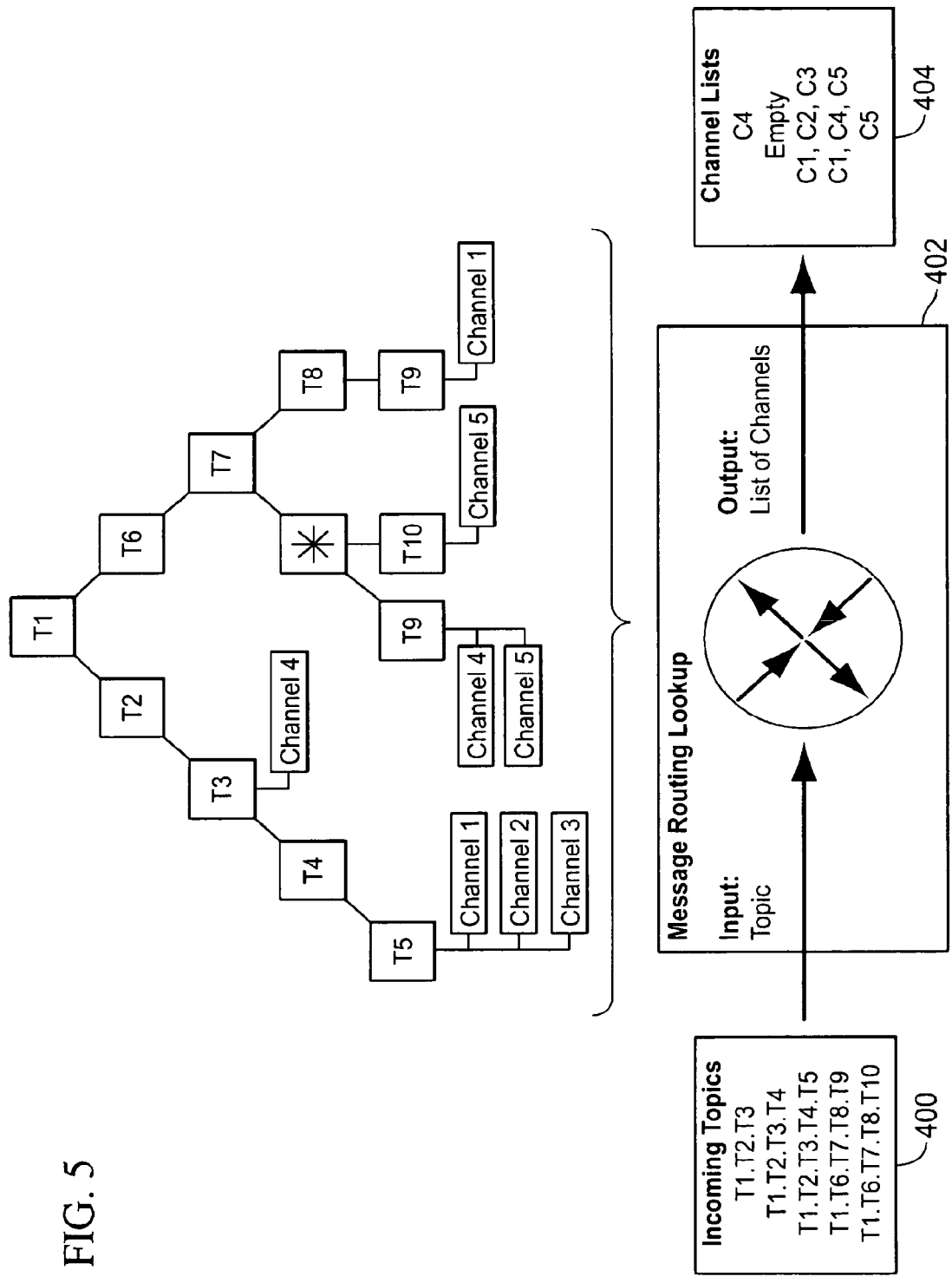
FIG. 5 shows a topic-based message routing and routing table.

FIG. 5 shows topic-based message routing. As indicated, a topic might be defined as a token-based string, such as T1.T2.T3.T4, where T1, T2, T3 and T4 are strings of variable lengths. As can be seen, incoming messages with particular topic notations 400 are selectively routed to communications channels 404, and the routing determination is made based on a routing table 402. The mapping of the topic subscription to the channel defines the route and is used to propagate messages throughout the publish/subscribe network. The superset of all these routes, or mapping between subscriptions and channels, defines the routing table. The routing table is also referred to as the subscription table. The subscription table for routing via string-based topics can be structured in a number of ways, but is preferably configured for optimizing its size as well as the routing lookup speed. In one implementation, the subscription table may be defined as a dynamic hash map structure, and in another implementation the subscription table may be arranged in a tree structure as shown in the diagram of FIG. 5

A tree includes nodes (e.g., $T_1, \ldots T_{10}$) connected by edges, where each sub-string of a topic subscription corresponds to a node in the tree. The channels mapped to a given subscription are stored on the leaf node of that subscription indicating, for each leaf node, the list of channels from where the topic subscription came (i.e. through which subscription requests were received). This list indicates which channel should receive a copy of the message whose topic notation matches the subscription. As shown, the message routing lookup takes a message topic as input and parse the tree using each sub-string of that topic to locate the different channels associated with the incoming message topic. For instance, $T_1, T_2, T_3, T_4$ and $T_5$ are directed to channels 1, 2 and 3; $T_1, T_2,$ and $T_3,$ are directed to channel 4; $T_1, T_6, T_7, T^*$ and $T_9$ are directed to channels 4 and 5; $T_1, T_6, T_7, T_8$ and $T_9$ are directed to channel 1; and $T_1, T_6, T_7, T^*$ and $T_{10}$ are directed to channel 5.

Although selection of the routing table structure is intended to optimize the routing table lookup, performance of the lookup depends also on the search algorithm for finding the one or more topic subscriptions that match an incoming message topic. Therefore, the routing table structure should be able to accommodate such algorithm and vice versa. One way to reduce the size of the routing table is by allowing the routing algorithm to selectively propagate the subscriptions throughout the entire publish/subscribe network. For example, if a subscription appears to be a subset of another subscription (e.g., a portion of the entire string) that has already been propagated, there is no need to propagate the subset subscription since the MAs already have the information for the superset of this subscription.

Based on the foregoing, the preferred message routing protocol is a topic-based routing protocol, where entitlements are indicated in the mapping between subscribers and respective topics. Entitlements are designated per subscriber or groups/classes of subscribers and indicate what messages the subscriber has a right to consume, or which messages may be produced (published) by such producer (publisher). These entitlements are defined in the P&M system, communicated to all MAs in the publish/subscribe network, and then used by the MA to create and update their routing tables.

Each MA updates its routing table by keeping track of who is interested in (requesting subscription to) what topic. However, before adding a route to its routing table, the MA has to check the subscription against the entitlements of the publish/subscribe network. The MA verifies that a subscribing entity, which can be a neighboring MA, the P&M system, a CE or an API, is authorized to do so. If the subscription is valid, the route will be created and added to the routing table. Then, because some entitlements may be known in advance, the system can be deployed with predefined entitlements and these entitlements can be automatically loaded at boot time. For instance, some specific administrative messages such as configuration updates, or the like might be always forwarded throughout the network and therefore automatically loaded at startup time.

In addition to its role in the subscription process, the P&M system has a number of other management functions. These additional functions include publish/subscribe system configuration and health monitoring and reporting. Configuration involves both physical and logical configuration of the publish/subscribe system network and components. The monitoring and reporting involves monitoring the health of all network and system components and reporting the results automatically, per demand or to a log.

Figure 6:
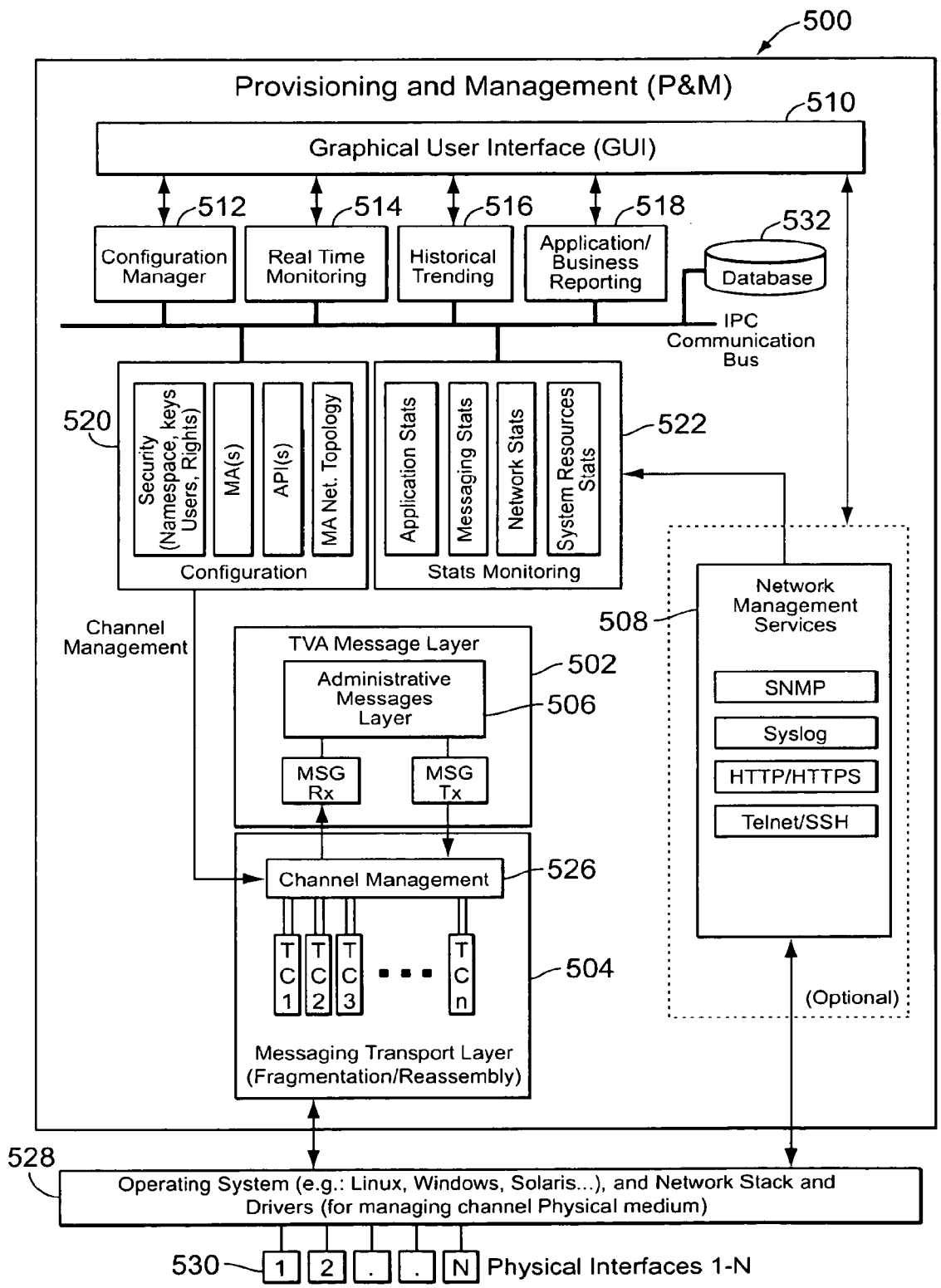
FIG. 6 is a block diagram illustrating a provisioning and management (P&M) system in accordance with one embodiment of the invention.

FIG. 6 is a block diagram illustrating a provisioning and management (P&M) system in accordance with one embodiment of the invention. As shown, the P&M system 500 can be deployed as a standalone appliance that communicates to one or more MAs in the publish/subscribe network. In an alternative embodiment, the P&M system can be integrated into an MA.

The P&M system performs its configuration, monitoring and reporting functions via administrative messages which are obtained from the administrative message layer 506 in the appliance message layer 502. Communications with other components in the network are done via the messaging transport layer 504 with all the aforementioned channel management which is typical to components in a system configured in accordance with the principles of the present invention. However, unlike the message transport layer in the MA which interacts directly with the physical medium interfaces, the P&M system is often implemented on top of the operating system 528 (OS) through which the messaging transport layer communicates with the physical medium interfaces (interfaces 1 ... N). Hence, in order to support the various types of channels, the OS may require particular drivers for each physical medium that would not otherwise be made available with the OS. The OS might also require a particular interface card for the medium (e.g., direct connect interface card or Infiniband interface card).

The P&M might also use a network management stack 508 to communicate with the network-based management services. Examples of such network-based services include SNMP (simple network management protocol), system logging, HTTP/HTTPS (hypertext transfer protocol over Secure Socket Layer), Telnet/SSH (Secure Shell Protocol).

The P&M may be provided with a graphical user interface (GUI) 510, built on top of a number of functional blocks. Examples of such functional blocks include the configuration manager 512, the real-time monitoring block 514, the historical trending block 516, and the business-logic/application reporting block 518. The configuration manager functional block handles the configuration of all the physical components involved in the publish/subscribe network. The configuration 520 of each of these components involves a number of aspects including, for instance, security, authentication, entitlements (rights in terms of which users are allowed to subscribe to what topics), and topology (including communication paths between these different components).

The real-time monitoring functional block 514 listens to (sniffs) the various events 522 occurring in the publish/subscribe network. Examples of these events include new subscription requests from API, new subscribers connected to the Publish/subscribe network, real-time statistics on different hardware components in the networked publish/subscribe system, size of routing tables for all MAs and levels of resource utilization.

The historical trending block 516 is preferably tightly linked to the real-time monitoring subsystem because a trend can be established over time, from events that are monitored in real-time. To this end, the historical trending block takes its input from the real-time monitoring subsystem, and stores each data point in a real-time database. The historical trending block can then query the real-time database and chart the events it retrieves as a function of time. This block can be further used to track the publish/subscribe network behavioral patterns over time.

The business logic reporting block 518 provides another level of reporting by correlating the raw data of event patterns over time in order to help in the business decision making process. In one implementation, the business logic reporting block translates into business metrics the low-level message and network metrics data (typical raw data), examples of which include message and frame rate, network delay, jitter and loss data.

Optionally also, the real time monitoring and business logic reporting block is used to monitor service level agreements (SLA) and verify that a specific level of service is met over time. When an SLA is not met, it allows understanding and legal proof of where the problem is and how it is observed, assuming that all parties have agreed on the validity of such reports. Furthermore, establishing trends of historical metrics might help understand the changes in messaging infrastructure, and it might give an insight into long term messaging traffic patterns. As a result, it becomes a very valuable input in the business decision process.

Figure 7A:
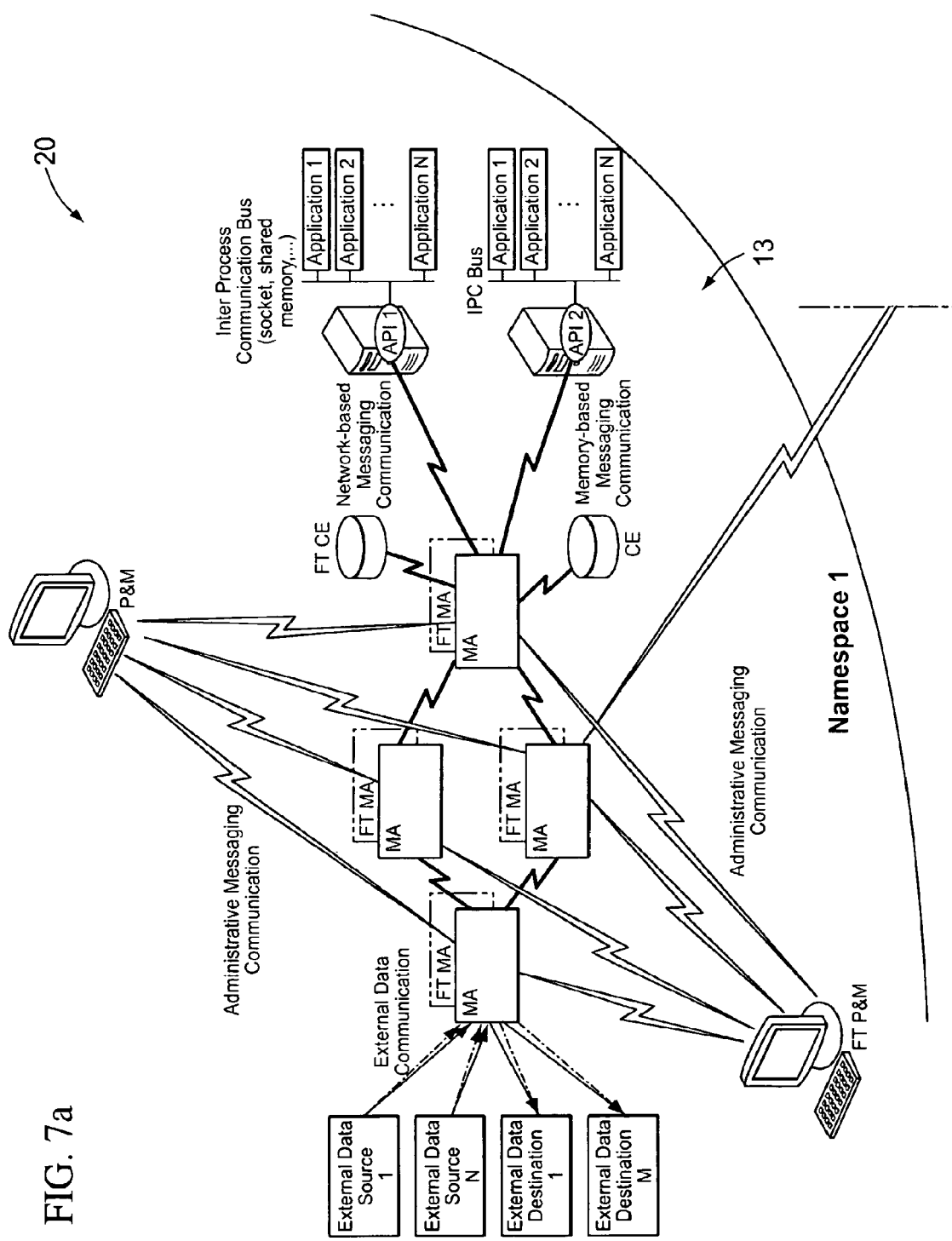
FIG. 7 illustrates a messaging (publish/subscribe) system with a namespace-based topology.
Figure 7B:
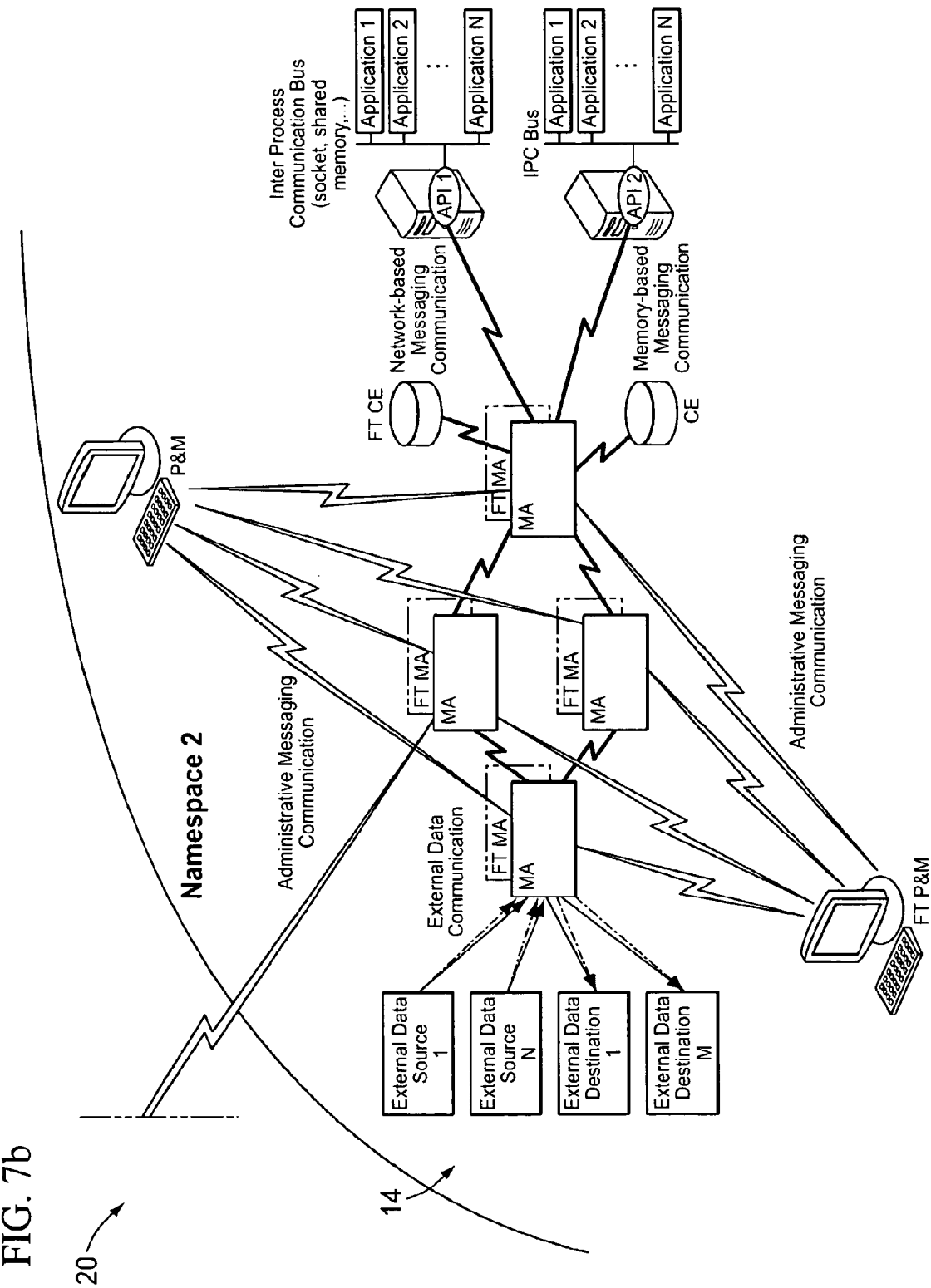

In addition, the P&M system allows the administrator to define a message namespace associated with each of the messages routed throughout a given publish/subscribe network. Accordingly, a publish/subscribe network can be physically and/or logically divided into name-space-based sub-networks. This namespace-based topology is illustrated on FIG. 7. The namespace is unique for each publish/subscribe sub-network. Therefore, in the combined publish/subscribe network each publish/subscribe sub-network has a unique namespace assigned to it. In this example, the publish/subscribe network is composed of two publish/subscribe sub-networks, the first one with namespace 'Namespace 1' and the second one with namespace 'Namespace 2'. Essentially, the namespace management feature (in items 520, 512 at FIG. 6) provides the capacity to define different administrative domains and enable topic-based message communications across these different administrative domains while avoiding topic collisions or duplications.

In one example, a publish/subscribe sub-network 'A' publishes news updates that are routed towards the publish/subscribe sub-network 'B' and sub-network 'C' publishes news updates that are also routed towards the sub-network 'B'. However, if sub-networks 'A' and 'C' publish the same news updates on the same topic, sub-network 'B' can differentiate between the news coming from 'A' and those that came from 'C' because of their associated namespace. In many instances, these namespace domains will be different intra-organizational domains. In other instances, these domains will be different organization or legal entities domains. In other words, the namespace feature may be used by an organization to limit entitlements to its data or content to certain users in or outside the organization. For users within the organization, this is done by issuing a namespace license to these users; and for users outside the organization, this is done by issuing a namespace license to the organization provided it has an MA.

Figure 8A:
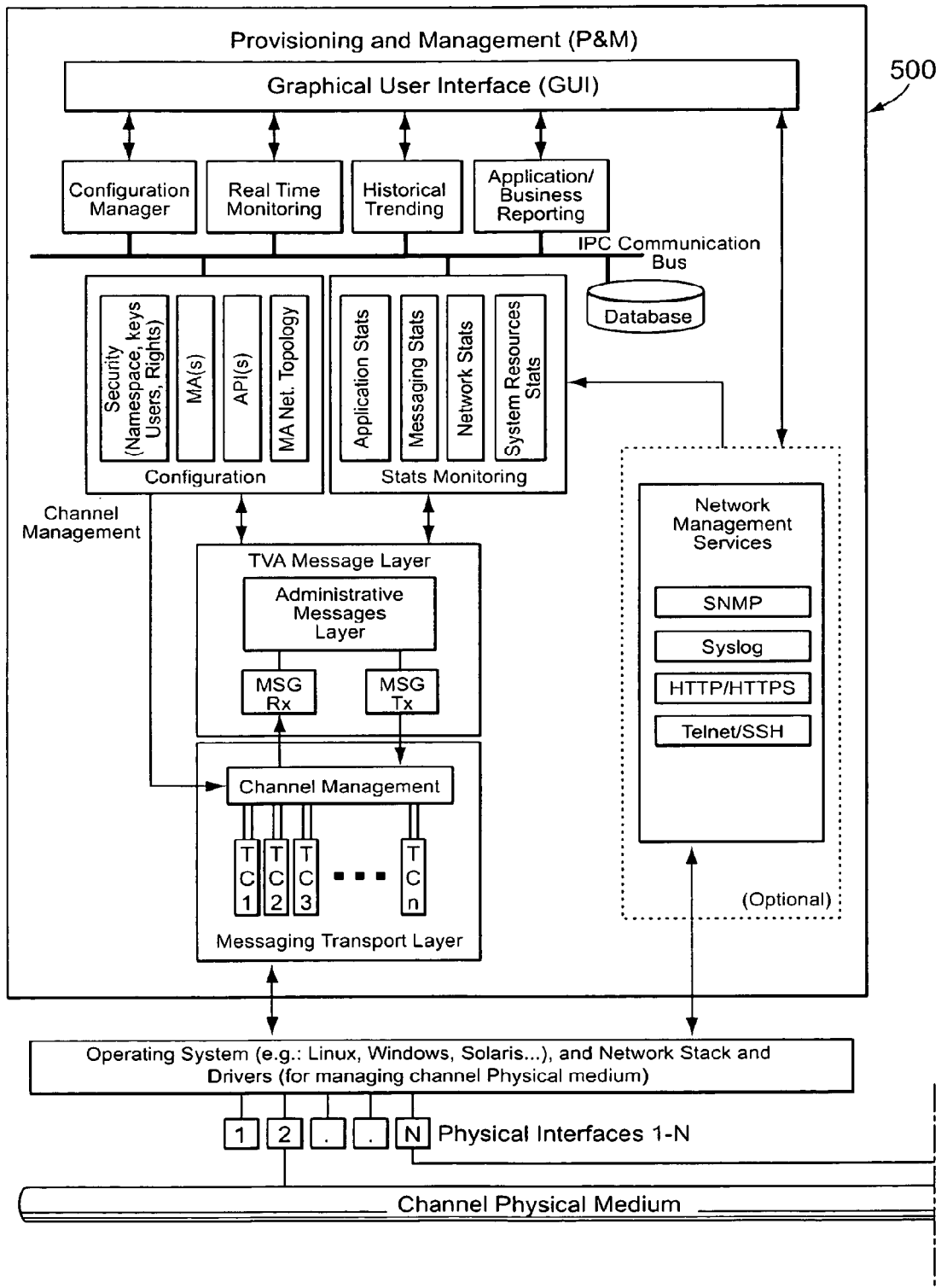
FIG. 8 is a diagram illustrating the communication between the P&M system and one of the message appliances (MAs).
Figure 8B:
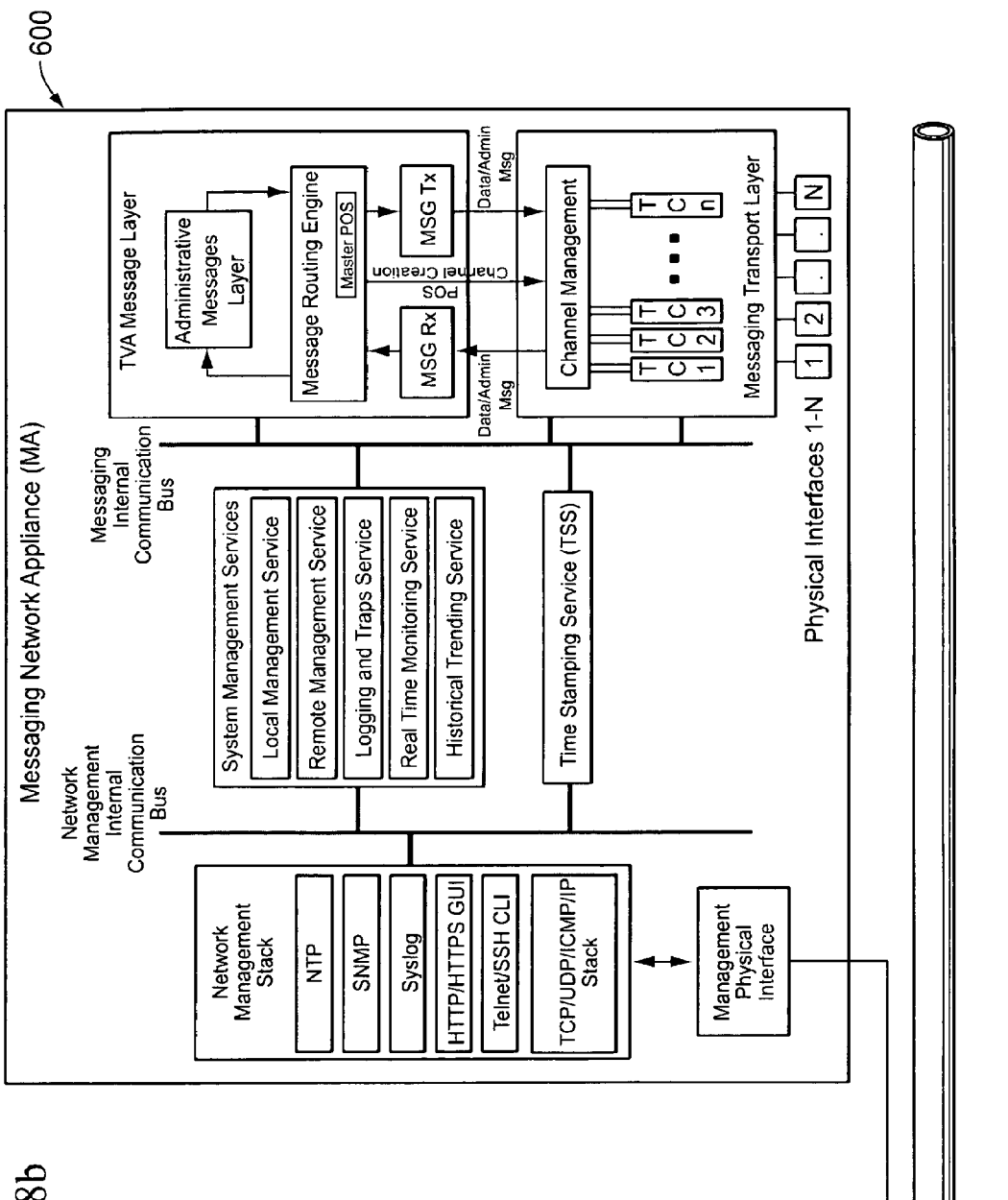

As mentioned, both configuration and monitoring of the system components are performed by communications of administrative messages. Accordingly, in order to communicate with the MAs, the P&M system uses the channel-based messaging stack 508 (along with message layer 502, message transport layer 504 and channel management 526). FIG. 8 is a diagram illustrating the communication between the P&M system and one of the MAs.

Figure 9:
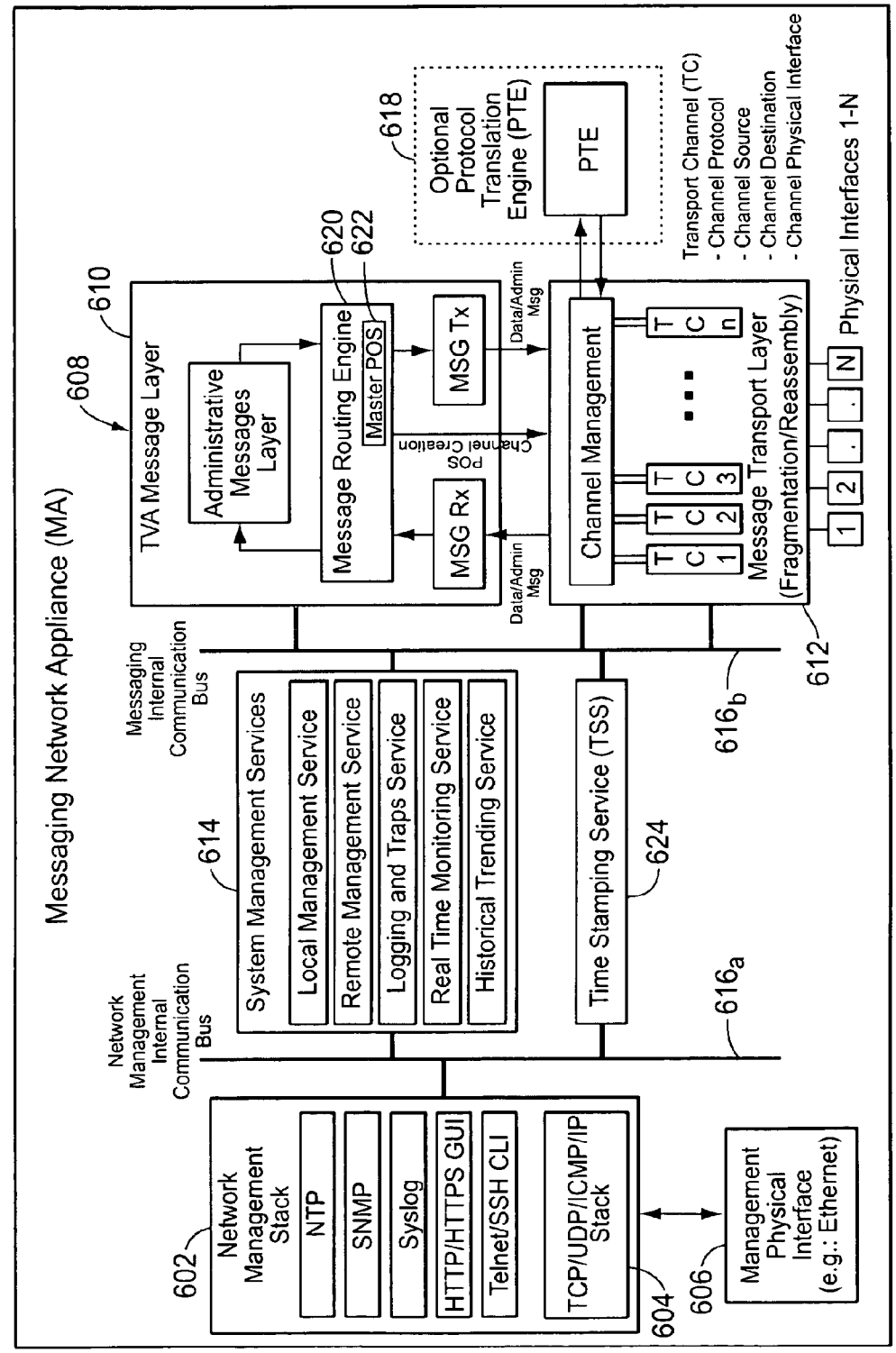
FIG. 9 is a block diagram illustrating an MA configured in accordance with the principles of the present invention.

Turning now to the Messaging Appliances (MAs), FIG. 9 is a block diagram illustrating an MA configured in accordance with the principles of the present invention. In one configuration, the MA is a standalone appliance. In another configuration, the MA is an embedded component within any network physical component such as a router or a switch. In the shown embodiment of an MA, it is divided into three different functional parts. The first part 602 includes the aforementioned network management services (e.g., NTP, SNMP, syslog, telnet/SSH, HTTP/HTTPS, and the like). These services are built on top of a standard network stack, such as TCP/IP stack 604, and they may use, for instance, a dedicated Ethernet network interface card (NIC) 606. In one embodiment, the use of a dedicated NIC provides a way to physically isolate the management traffic from the data messaging traffic. The second part is defined as the messaging stack 608 with a message layer (e.g., Tervela™ message layer) 610 at the top and a transport message layer 612 below it. The messaging stack 608 handles any messaging traffic going in and out of the MA. The third part 614 includes the internal services. These services are used inside the MA, and don't have any direct external interface. Examples of these internal services include system management service such as local and remote management, logging, real-time monitoring and historic trends services. The internal services can be requested via an internal communication bus 616 with calls from any of the aforementioned first and second parts.

In other words, these internal services communicate indirectly with the P&M system through administrative messages generated by the native messaging layer 610, or via the network management stack 602. They keep track of the general health of the system, including particular performance metrics and statistics of the messaging layer and the underlying physical medium. These statistics can be stored on a per-channel basis, or they can be aggregated by computing moving weighted averages over time for the entire system.

In addition to the above-mentioned internal services, another internal service is the time stamping service (TSS) 624 which can be used to request an accurate timestamp. In one configuration, the TSS is based on a GPS signal received directly by the MA. Alternatively, the MA's internal processor clock is used instead of a GPS signal. The clock needs to be periodically updated and synchronized with an external time source, however. The network time protocol (NTP) or another comparable source are often used for this purpose and are suitable here as well. For a system with multiple MAs, the internal TSS can be synchronized across the multiple MAs by using standard network time protocols such as the NTP. In particular, one master MA would be synchronized to an external time source, and the neighboring MAs in the publish/subscribe network then synchronize themselves with the master MA. The time synchronization between MAs could be implemented by using a particular administrative message protocol to exchange time information. Alternatively, time synchronization could be implemented with the time information embedded in each data message routed throughout the publish/subscribe network.

In the illustrated MA, the native (e.g., Tervela™) messaging layer 610 has a number of roles two of which are to route native protocol messages and to handle local administrative messages. An administrative message might be a registration request of an API, a subscription request from an API, a configuration update from the P&M system, and more. Administrative messages are typically standard messages with specific administrative topics. Therefore, the MA will have to subscribe to the specific administrative messages (to the administrative topics) before any messages can be delivered locally in the MA. The initial administrative topic subscriptions can be inserted in the routing table as 'static' (fixed) routes that are pre-defined in the system for the delivery of administrative messages. These so called static routes map administrative subscriptions locally to the particular MA indicating to the message routing engine that it should deliver the matching administrative messages locally.

Whenever a message is generated locally in and routed by the MA or is forwarded via the MA, the message routing engine (MRE) 620 searches for channels that have subscriptions matching the topic of the message. The routing table lookup is expected to return a list of one or more channels that satisfy this criterion. However, if the returned list of channels is empty, the message will be dropped instead of being forwarded. Otherwise, if the returned list of channels is not empty, a copy of the message will be sent to each channel in this list. Preferably, instead of sending a separate copy of the message to each channel, the channel management module keeps only one copy of the message in memory, and it additionally keeps track of how many channels are obtaining and transporting this message. When all channels are done sending the message over their own physical mediums, the reference count goes back to zero, and the channel management can then free the memory allocated for that message. This is one example of how to optimize allocation and use of the system resources, in this case memory buffers in the messaging transport layer.

Note that before the MRE 620 sends the message to the message transport layer 612 for all the channels that require a copy of the message, the MRE obtains and records statistics on consumption patterns over these channels and system resources allocated for these channels. This monitoring and statistics tracking task is performed by the protocol optimization service (POS) 622.

If the POS determines that the system and channel resources at the source, destination, or both, are not optimally used it may adjust the channel configuration, or even create a new channel that will make a better use of the system and channel resources. For example, by monitoring metrics associated with the system and channel resources, e.g., latency and discard rate, the POS can change the channel communication protocol if these metrics go above or below predetermined thresholds. The discard rate is defined as the percentage of discarded messages from the total number of received messages. Messages are discarded when they are delivered to their destinations (e.g., APIs) via multicast channels and the destinations don't have the same subscription patterns. If the discard rate exceeds a percentage threshold, the MA may decide to switch the channel communication from multicast to unicast, or redistribute the subscriptions over the existing multicast channels.

As mentioned, the publish/subscribe network might be built on top of an IP-based network. In that case, the MA may have multiple unicast channels with different consumers, which are subscribing to the same topics. All these channels might share the same medium bandwidth. If the message rate increases sharply, the MA may no longer use the available bandwidth of the medium efficiently if the MA has to send multiple copies of the same message to all the consumers. Therefore, the POS might decide to switch from unicast-based channel protocols to a multicast-based channel protocol that will send only one copy of the message to all consumers located on that same medium. To switch from one type of channel protocol to another, the POS 622 module running on the MA 600 will notify the POS module on the API(s) that another channel needs to be created to optimize the channel resources. When the channel is created and ready, the MA switches from the old channel to the new one.

Then, for the particular case of an edge MA, when a channel delivers an incoming message to the channel management module, the first check is to verify whether the message protocol differs from the native message protocol. If it does, the channel management module will request the protocol translation engine 618 to convert the incoming messages to the native (e.g., Tervela™) message protocol. When the message is converted, it is handed off to the (Tervela™) messaging Layer 610. Otherwise, in the case of a core MA, when a channel handles an incoming message, the message is handed off to the native (Tervela™) messaging layer assuming that all channels are using this native message protocol and, therefore, all messages already have the native message format.

Figure 10A:
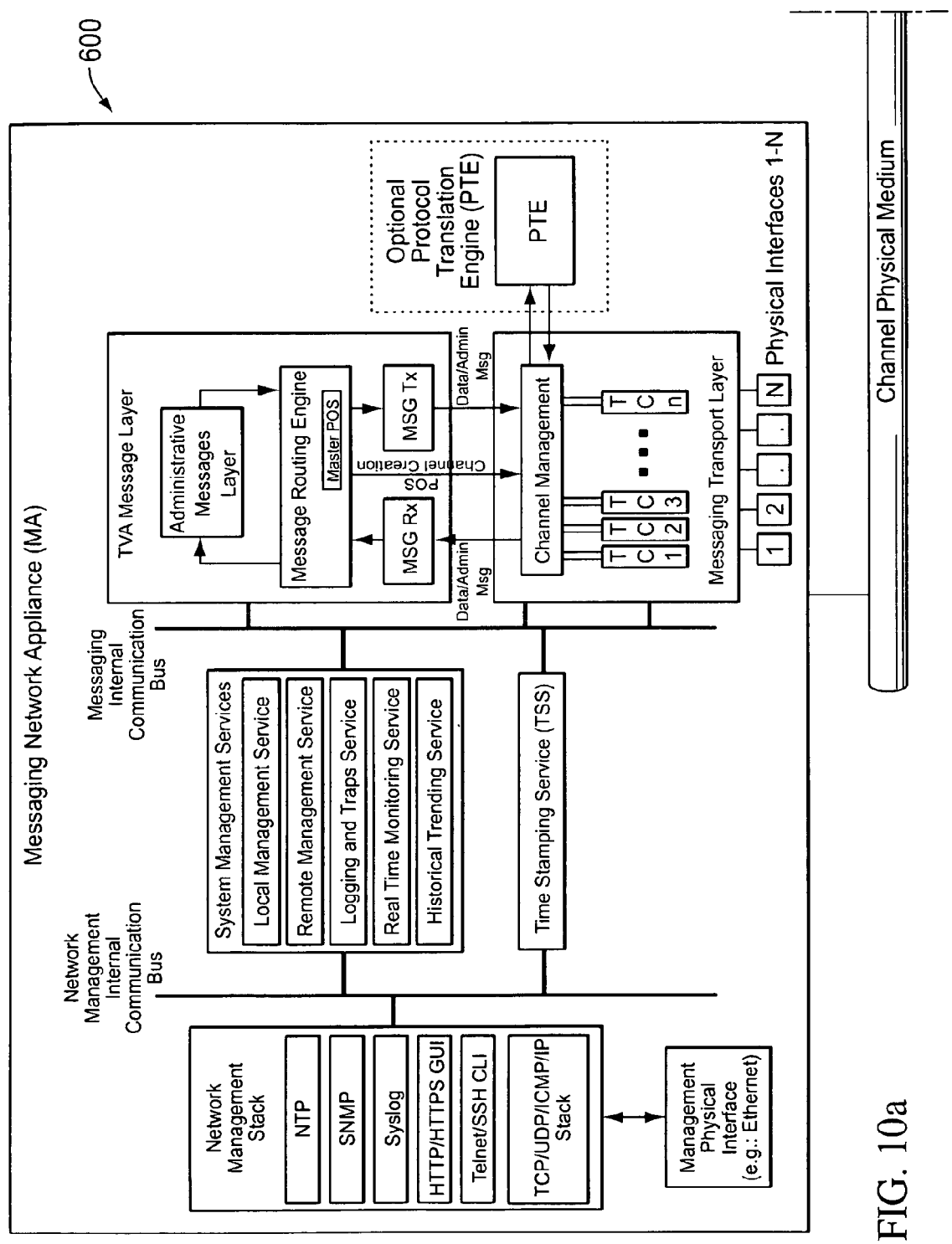
FIG. 10 shows the interface for communications between the MA and the CE (caching engine).
Figure 10B:
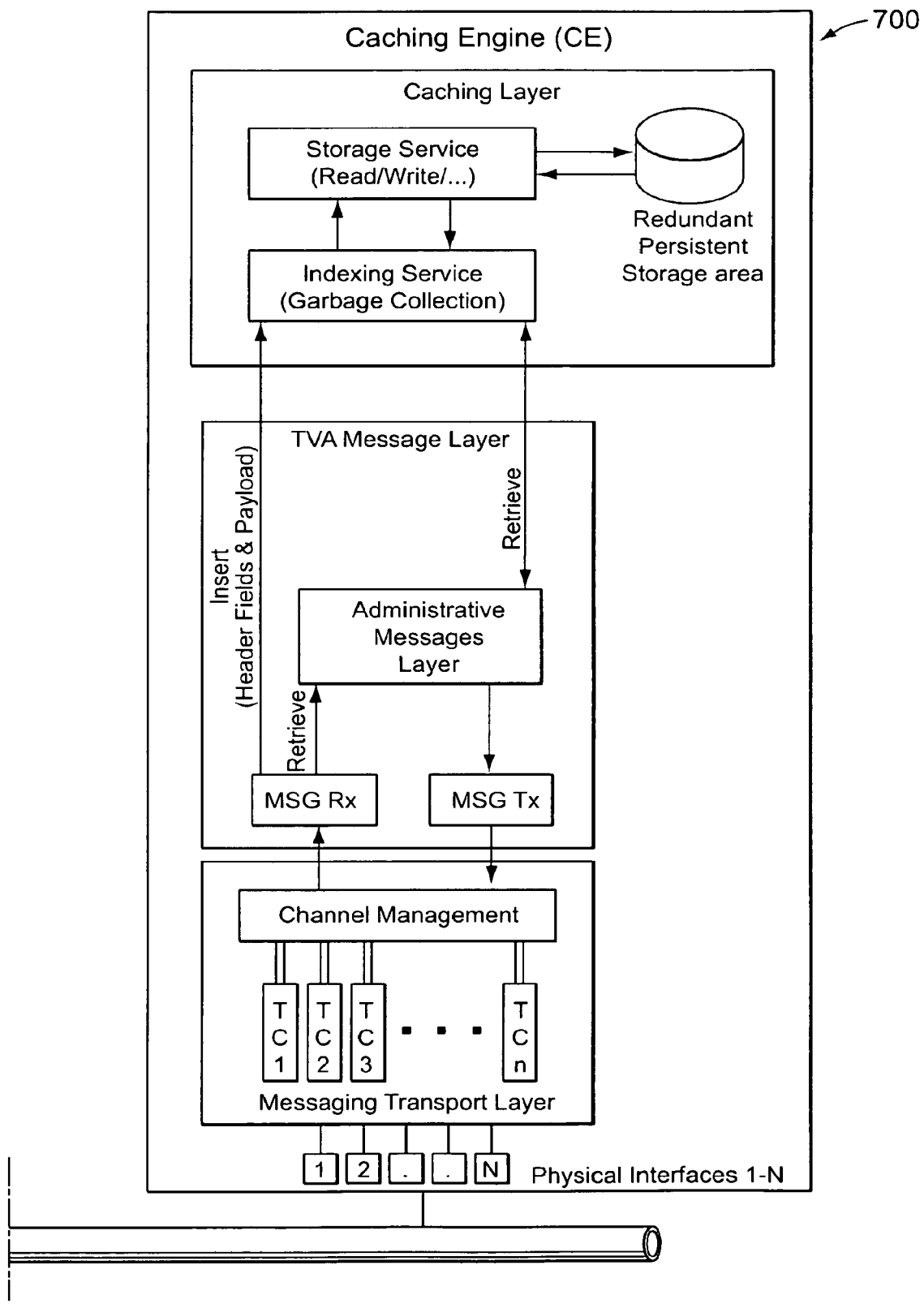
Figure 11A:
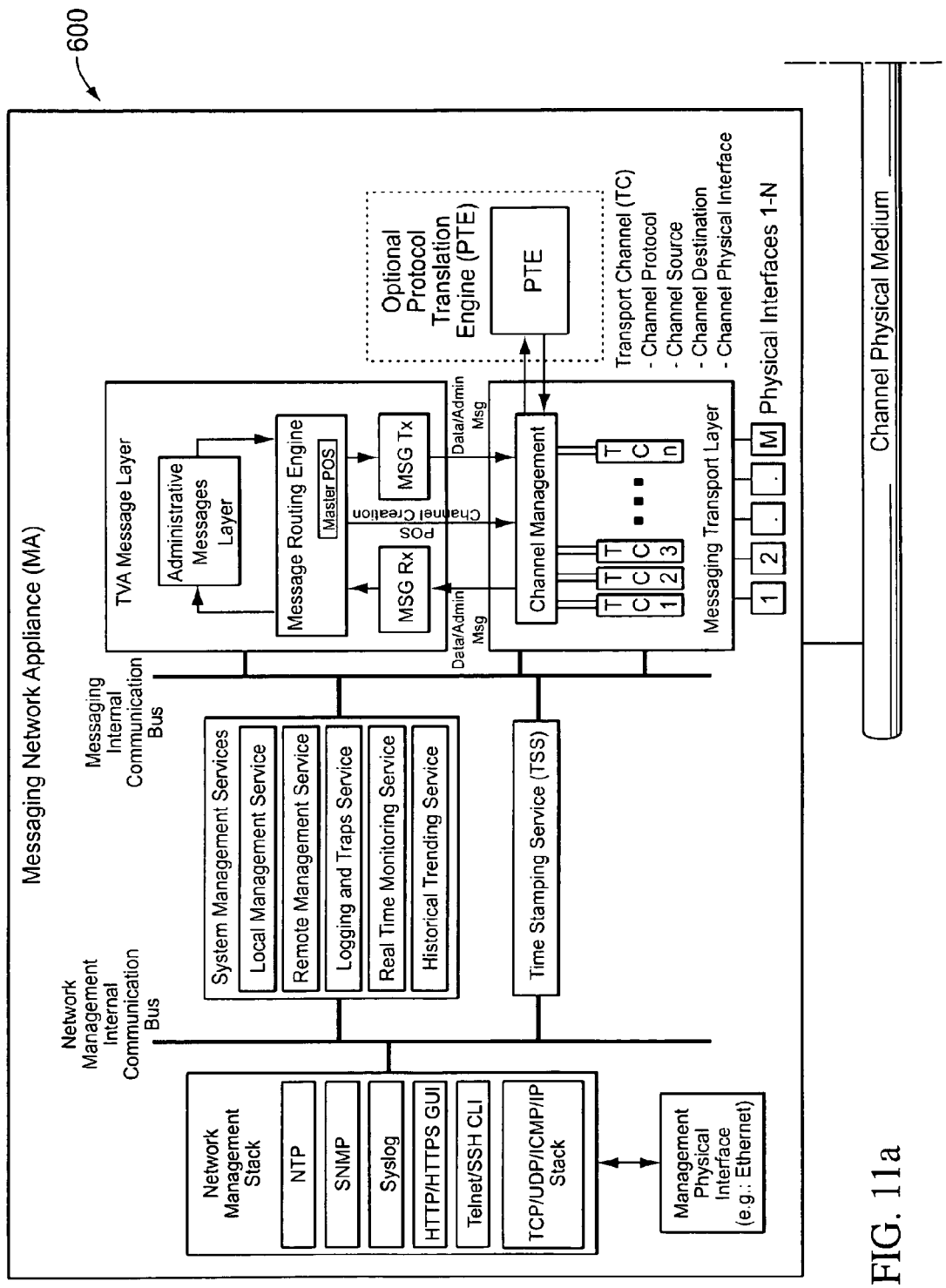
FIG. 11 shows the interface for communications between the MA and the application programming interface (API).
Figure 11B:
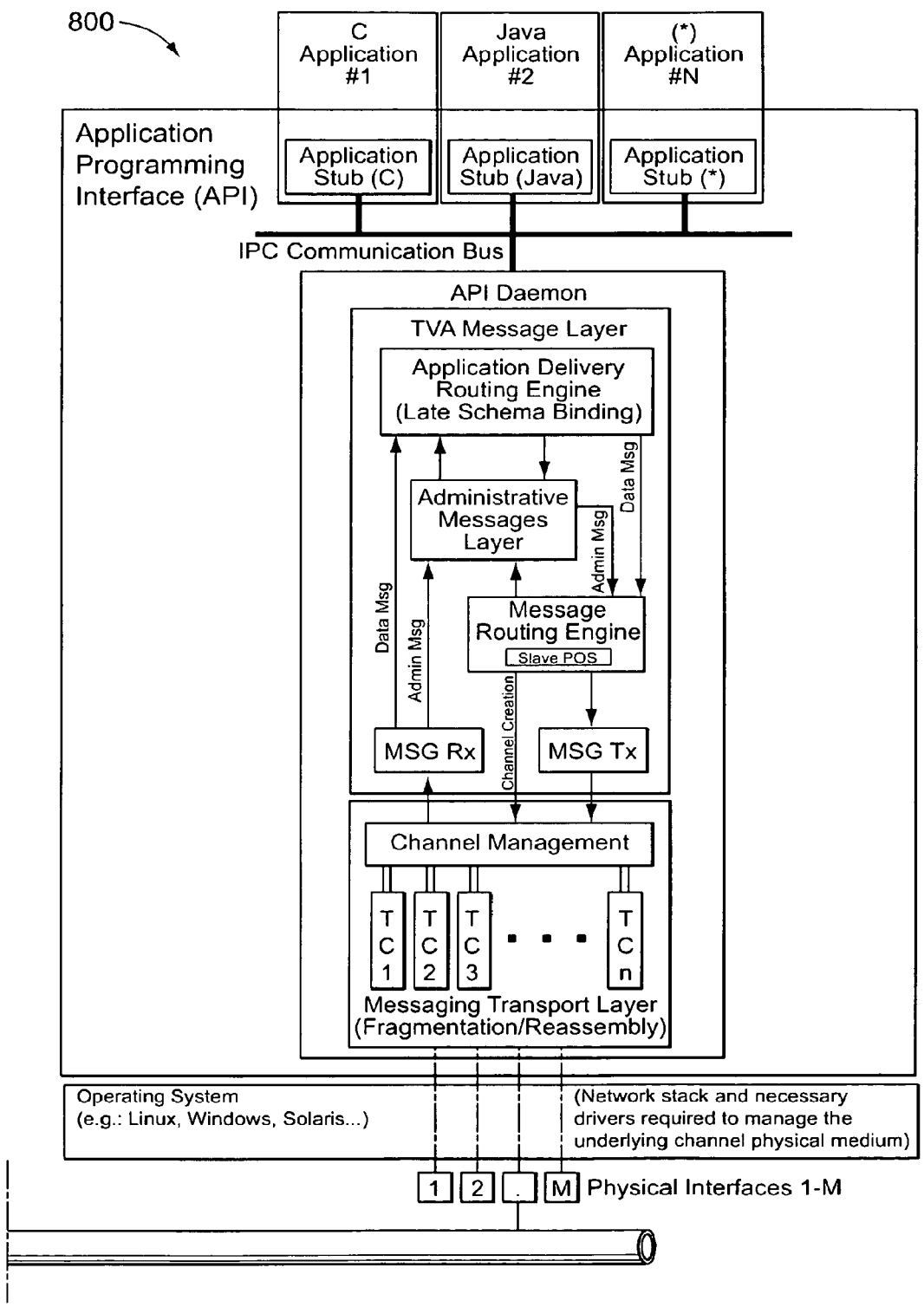

As described earlier, all messages that are routed in the publish/subscribe network are received or sent on a particular channel (see inside message transport layer 612). Using these channels, the MA communicates with all other physical components in the publish/subscribe network. These communication interfaces are represented in the diagrams where in FIG. 8 the interface is shown for communications between the P&M system and the MA, in FIG. 10 the interface is shown for communications between the MA and the CE (caching engine), and in FIG. 11 the interface is shown for communications between the MA and the API.

Figure 12:
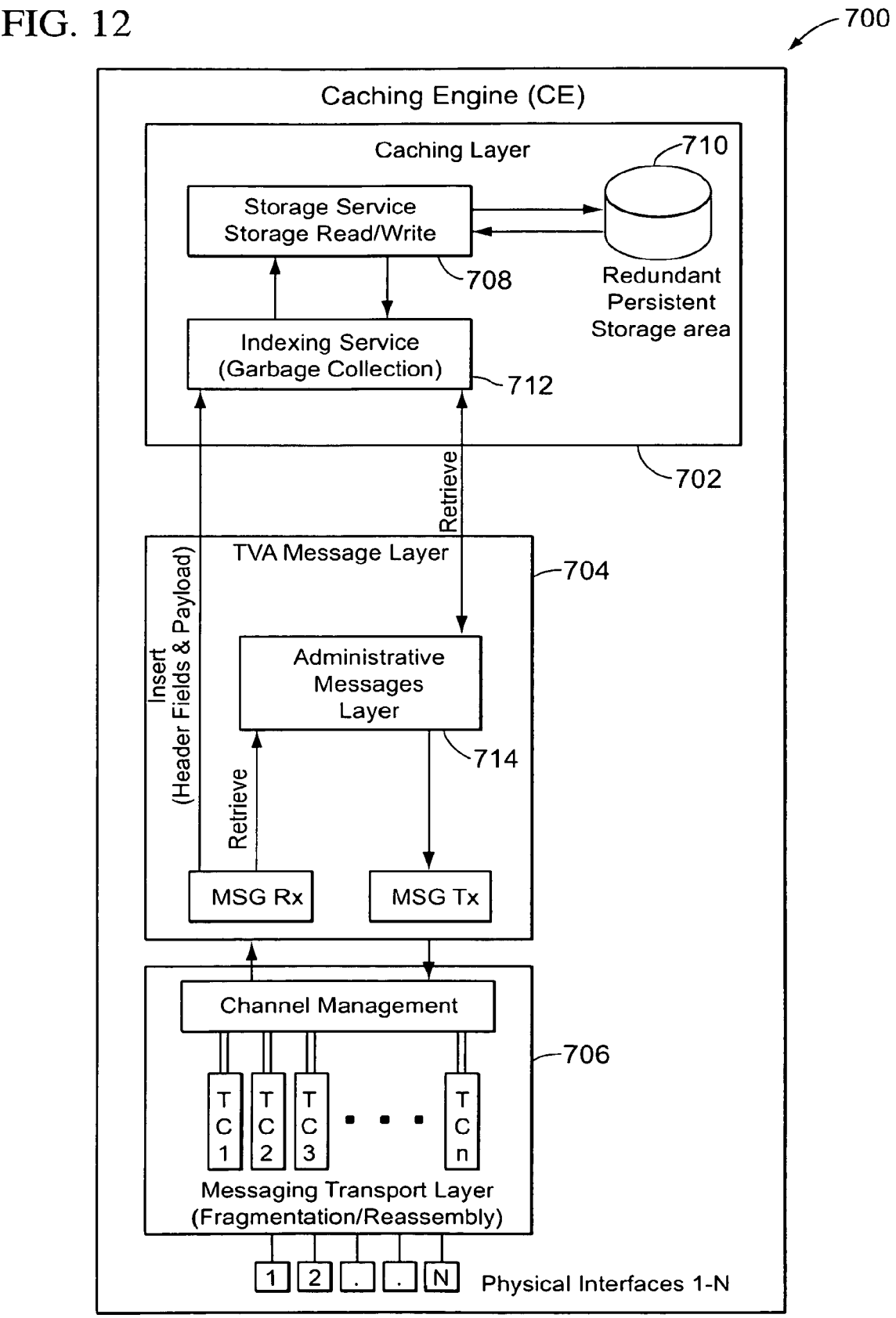
FIG. 12 is a block diagram illustrating a CE configured in accordance with one embodiment of the invention.

There are times when these interfaces are interrupted or destinations can't keep up with the load. In these and other similar situations, the messages may be recalled from storage and retransmitted. Hence, whenever message data storage such as store and forward functionality is needed the MAs can operatively associate with a caching engine (CE). The CE is connected via a physical medium directly to the MA (as shown on FIGS. 1 and 10), and it is designed to provide the feature of a store-and-forward architecture in a high-volume and low-latency messaging environment. FIG. 12 is a block diagram illustrating a CE configured in accordance with one embodiment of the invention.

The CE 700 performs a number of functions. For message data persistency, one function involves receiving data messages forwarded by the MA, indexing them using different message header fields, and storing them in a storage area 710. Another function involves responding to message-retrieve requests from the MA and retransmitting messages that have been lost, or not received, (and thus requested again by consumers).

Generally, the CE is built on the same logical layers as an MA. However, its native (e.g., Tervela™) messaging layer is considerably simplified. There is no need for routing engine logic because, as opposed to being routed to another physical component in the publish/subscribe network, all the messages are handled and delivered locally at the CE to its administrative message layer 714 or to its caching layer 702. As before, the administrative messages are typically used for administrative purpose, except the retrieve requests that are forwarded to the caching layer 702. All the data messages are forwarded to the caching layer, which uses an indexing service 712 to first index the messages, and then a storage service 708 for storing the messages in the storage area 710. All data messages are stored for a predefined period of time. The indexing service 712 is responsible for 'garbage collection' activity and notifies the storage service 708 when expired data messages need to be discarded from the storage area.

Figure 13:
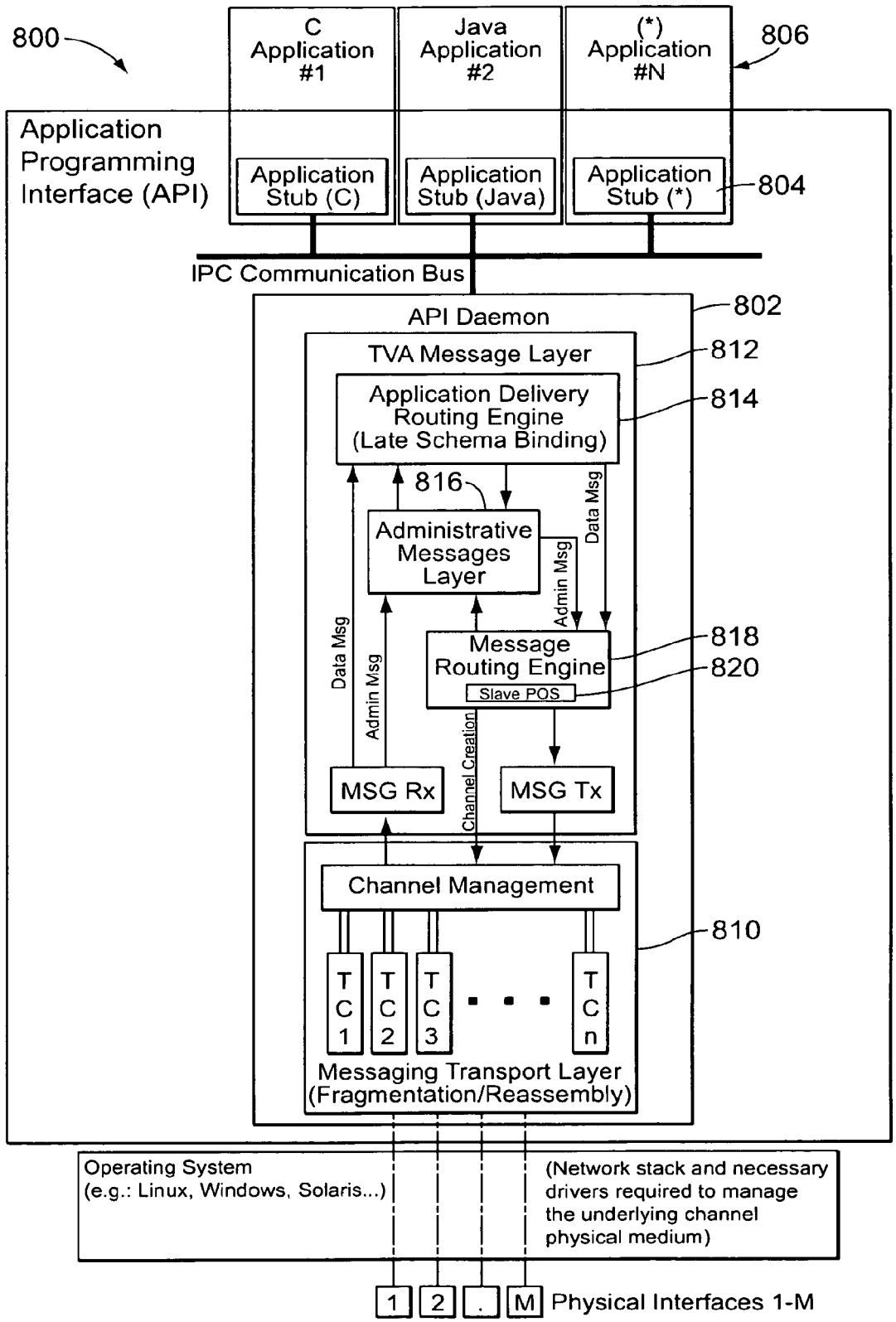
FIG. 13 is a block diagram of an API configured in accordance with one embodiment of the present invention.

In addition to CEs, the MAs communicate with the aforementioned APIs. FIG. 13 is a block diagram of an API configured in accordance with one embodiment of the present invention.

The illustrated API 800 is a combination of an API communication engine 802 and API stubs 804 that are compiled and linked to all the applications 806 that use the API. One implementation of the communication engine could be a daemon. Communications between the API stubs and the API communication engine are done via an inter-process communication bus 808, implemented using mechanisms such as sockets or shared memory. The API stubs 804 are available in various programming languages, including C, C++, Java and .NET. In some instances, the API itself might be available in multiple languages. The API runs on various operating system platforms three examples of which are Windows™, Linux™ and Solaris™. Alternatively, the API communication engine and stubs can be merged at compile time with the application, as a monolithic API, to eliminate the need for spawning an additional process on the application server.

Much like the CE, the API communication engine is built on the logical layers found in the MA. In order to be able to communicate with the MA, the API also has a messaging transport layer 810. However, the messaging transport layer in the API and the MA differ from each other because, unlike the MA which interacts directly with the physical medium interfaces, the API sits in most implementations on top of an operating system (as is the case with the P&M system). In order to support different types of channels, the OS may require specific drivers for each physical medium that is otherwise not supported by the OS by default. The OS might also require the user to insert a specific physical medium card. For instance, physical mediums such as direct connect (DC) or Infiniband require a specific interface card and its associated OS driver to allow the messaging transport layer to send messages over the channel.

The messaging layer 812 in an API is also somewhat similar to a messaging layer in an MA. The main difference, however, is that the incoming messages follow different paths in the API and MA, respectively. In the API, the data messages are sent to the application delivery routing engine 814 (less schema bindings) and the administrative messages are sent to the administrative messages layer 816. The application delivery routing engine behaves similarly to the message routing engine 818, except that instead of mapping channels to subscriptions it maps applications (806) to subscriptions. Thus, when an incoming message arrives, the application delivery routing engine looks up for all subscribing applications and then sends a copy of this message or a reference to this message to all of them.

In some implementations, the application delivery routing engine is responsible for the late schema binding feature. As mentioned earlier, the native (e.g., Tervela™) messaging protocol provides the information in a raw and compressed format that doesn't contain the structure and definition of the underlying data. As a result, the messaging system beneficially reduces its bandwidth utilization and, in turn, allows increased message volume and throughput. When a data message is received by the API, the API binds the raw data to its schema, allowing the application to transparently access the information. The schema defines the content structure of the message by providing a mapping between field name, type of field, and its offset location in the message body. Therefore, the application can ask for a specific field name without knowing its location in the message, and the API uses the offset to locate and return that information to the application.

To a large extent, outgoing messages follow the same outbound logic as in the MA. In this example, the API has a protocol optimization service (POS) 820 that tracks statistics about consumption patterns, system and channel resource utilization (as is done in the MA). However, unlike the POS in the MA which makes its own decisions on when to change the channel configurations, the POS in the API acts as a slave of the master POS in the MA to which it is linked. When the POS on the MA decides to change the channel configurations, it remotely controls the slave POS at the API.

Figure 14:
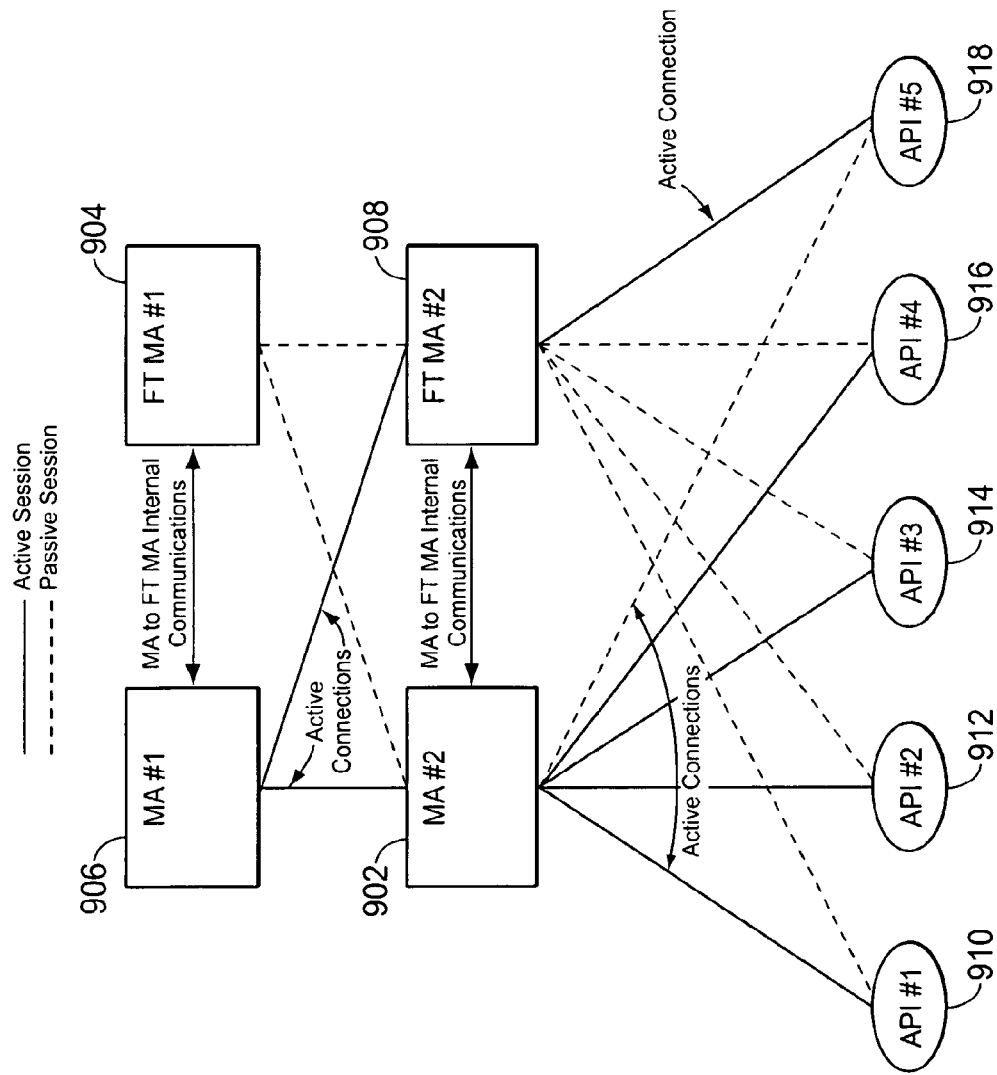
FIG. 14 illustrates a system designed with session-based fault tolerant configuration in accordance with the principles of the present invention.

As mentioned above, for availability and reliability of the system and consistency and persistency of the message data it is advantageous to configure the system as a fault tolerant system. Preferably, the system is designed with session-based fault tolerant configuration as shown in FIG. 14. Another possible configuration is full failover but in this instance we chose session-based fault tolerance instead.

A session encompasses the communications between two MAs or between one MA and an API (e.g., 910). A session can be active or passive. This configuration uses primary and secondary MAs (e.g., 906 and 908). If a failure occurs, the MA or the API may decide to switch the session from the primary MA 906 to the secondary MA 908. A failure occurs when a session experiences failures of connectivity and/or system resources such as CPU, memory, interfaces and the like. Connectivity problems are defined in terms of the underlying channel. For instance, an IP-based channel would experience connectivity problems when loss, delay and/or jitter increase abnormally over time. For a memory-based channel, connectivity problems may be defined in terms of memory address collisions or the like.

Overall, the session-based fault tolerant design has the advantage of not affecting all the sessions when only one or a subset of all the sessions is experiencing problems. That is, when a session experiences some performance issues this session is moved from the primary MA (e.g., 906) to the secondary fault tolerant (FT) MA 908 without affecting the other sessions associated with that primary MA 906. So, for instance, $API_{1-4}$ are shown still having their respective active sessions with the primary MA 902 (as the active MA), while APIs has an active session with the FT MA 908.

The primary and secondary MA may be seen as a single MA using some channel-based logic to map logical to physical channel addresses. For instance, for an IP-based channel, the API or the MA could redirect the problematic session towards the secondary MA by updating the ARP cache entry of the MA logical address to point at the physical MAC address of the secondary MA.

In sum, the present invention provides a new approach to messaging and more specifically an end-to-end middleware architecture that improves the effectiveness of messaging, systems. Although the present invention has been described in considerable detail with reference to certain preferred versions thereof, other versions are possible. Therefore, the spirit and scope of the appended claims should not be limited to the description of the preferred versions contained herein.

What is claimed is:

1. An end-to-end publish/subscription messaging system with a middleware architecture, comprising:
   at least one messaging appliance configured to receive and route messages; and
   an interconnect utilizing channel-based messaging that routes messages over a first messaging layer based on at least one channel, each channel mapped to a subscription topic, each channel assigned to a communication pathway of a second messaging layer,
   wherein each messaging appliance is further configured to execute the routing of messages by dynamically selecting, in real time, a message transmission protocol and a message routing path.

2. The system of claim 1, wherein the messaging appliances include one or more of an edge messaging appliance and a core messaging appliance.

3. The system of claim 1, wherein each edge messaging appliance is linked to a message transformation engine for transforming incoming messages from an external protocol to a native protocol and for transforming routed messages from the native protocol to the external protocol.

4. The system of claim 1, wherein the message transmission protocol is selected to be one of a unicast, multicast or broadcast protocol.

5. The system of claim 1, further including one or more application programming interfaces configured for interfacing between one or more applications and one of the messaging appliances.

6. The system of claim 5, in which the messaging appliances and the one or more application programming interfaces are operative to communicate with each other by incorporating one or more messages in a single frame.

7. The system of claim 1, wherein each of the applications is configured to send requests, including registration and subscription requests, to a respective one of the messaging appliances.

8. The system of claim 1, wherein each of the application programming interfaces is logically linked to a messaging appliance having been registered to it via a topic-based subscription.

9. The system of claim 8, wherein the messaging appliances include one or more core messaging appliances to which the application programming interfaces register.

10. The system of claim 1, wherein the subscriptions are topic-based each being established via a subscription request, and wherein a single subscription request is capable of establishing subscriptions to a group of related topics.

11. The system of claim 1, in which the interconnect is an interconnect network over which the messaging appliances is deployed, the network being configured with any number of routers, a switches and a subnets.

12. The system of claim 1, wherein the interconnect is a channel-based, fabric agnostic physical medium.

13. A system as in claim 1, wherein the messaging appliances and interconnect incorporate transport logic.

14. The system of claim 13, configured for transport transparent channel-based messaging where messages are communicated in native protocol format independent of the transport logic.

15. The system of claim 1, further comprising one or more external sources and external destinations, wherein the messaging appliances include one or more edge messaging appliances, each associated to a protocol translation engine and translating messages between external and native protocols, and one or more core messaging appliances, each conducting communications of messages with the native protocol, the external sources and destinations communicating with the edge messaging appliances which, in turn, communicate with the core messaging appliances using neighbor-based message routing.

16. The system of claim 15, in which an edge MA is operative to route an ingress message simultaneously to both a native protocol consumer and an external protocol consumer.

17. The system of claim 1, wherein the messages are constructed with schema and payload which are separated from each other when messages enter the system, and which are combined when messages leave the system.

18. The system of claim 1, wherein, with the namespace management, consumers or external destinations who are subscribed to topics associated with a particular namespace are entitled to publish and subscribe messages identified with such topics.

19. The system of claim 1, wherein each messaging appliance has a routing table with routing of messages between messaging appliances being neighbor-based such that each messaging appliance is configured to route messages via one of its channels to a neighbor that has subscribed to all or a subset of messages transmitted via that channel, and wherein each messaging appliance is further configured to optimize the mapping between its subscriptions and channels in order to reduce the discard rate at neighbor that subscribe only to a subset of the messages.

20. The system of claim 1, wherein the routing table has one of a plurality of structures two of which are a tree structure and a dynamic has map structure.

21. The system of claim 1, wherein the messages and administrative messages have a topic based format, each message having a header and a payload, the header including a topic field in addition to source and destination namespace identification fields.

22. The system of claim 21, wherein the topic field includes a variable-length string or a key, the key being a unique value.

23. The system of claim 21, wherein the messages include a subscription message with a topic field that has a variable-length string with any number of wild card characters for matching it with any topic substring provided that such topic and the subscription message have the same number of topic substrings.

24. The system of claim 1, wherein the dynamic selection of transmission protocol and message routing path is based on system topology, health and performance reports and it involves one or both of dynamic resource allocation and dynamic channel creation and/or selection.

25. The system of claim 1, having boundaries that transcend regional, national or continental borders, with subsystems in each region, country or continent, wherein the subsystems are linked via a networking infrastructure and each subsystem includes an interconnect and one or more messaging appliances.

26. The system of claim 1, in which each messaging appliance includes: a network management stack linked to a physical interface management functional block; a services block containing a system management services functional block and a time stamping service functional block, both linked via a network management internal communications logical bus to the network management stack; and a native message layer in communication with a messaging transport layer, both of which linked via a messaging internal communications logical bus to the services block.

27. The system of claim 26, wherein the native message layer includes an administrative message layer, a message routing engine, message transmit and message receive logic and a master protocol optimization service.

28. The system of claim 26, wherein the messaging transport layer include channel management, and wherein the dynamic selection of a message routing path includes selection and/or creation of a channel.

29. The system of claim 28, wherein each channel is configured for network-based, node-based or memory-based transmission protocol and is associated with a physical interface to a physical medium which is fabric agnostic.

30. The system of claim 29, wherein the physical medium is configured as Ethernet, memory-based direct connect or Infiniband.

31. The system of claim 28, wherein the interconnect includes the transport channel and physical medium through which the messaging appliance communicates with the provisioning and management system.

32. The system of claim 1, further comprising one or more caching engines each operatively connected to a respective messaging appliance for providing quality of service functionality including message data store and forward functionality.

33. The system of claim 32, wherein each caching engine includes a caching layer connected with a native message layer which is, in turn, connected to a message transport layer, wherein the caching layer includes storage, a storage service and an indexing service.

34. The system of claim 1 wherein one or more of the messaging appliances is operatively connected to an application via an application programming interface that is registered to such messaging appliance and delivers messages between the application and the messaging appliance.

35. The system of claim 34, wherein each messaging appliance includes a master protocol optimization service and each application programming interface includes a slave protocol optimization service responsive to its respective master protocol optimization service.

36. The system of claim 34, wherein each application programming interface includes, a communication engine and one or more application stubs linked thereto.

37. The system of claim 36, wherein the communication engine is a daemon.

38. The system of claim 34, wherein each application programming interface is deployed on top of an operating system in the client application host.

39. The system of claim 34, wherein each application programming interface includes: an application delivery engine for transmitting messages to the application; and an administrative message layer for handling administrative messages.

40. The system of claim 1, wherein each of the messaging appliances are configured for fault tolerance.

41. The system of claim 40, in which the messaging appliances are arranged in fault tolerant pairs each pair including a primary and secondary messaging appliance, the secondary messaging appliance taking over a session from the primary messaging appliance upon failure of such session but without interfering with other active sessions on the primary messaging appliance.

42. A system with a publish/subscribe middleware architecture, comprising:
a plurality of namespace domains; and
a physical domain interconnect medium for connecting at least two of the namespace domains,
wherein each namespace domains includes:
at least one messaging appliance configured to receive and route messages; and
an interconnect utilizing channel-based messaging that routes messages over a first messaging layer based on at least one channel, each channel mapped to a subscription topic, each channel assigned to a communication pathway of a second messaging layer,
wherein each messaging appliance is further configured to execute the routing of messages by dynamically selecting a message transmission protocol and a message routing path.

43. An enterprise system with a publish/subscribe middleware architecture, comprising:
a market data delivery infrastructure having at least one messaging appliance for receiving and routing market data messages;
a market order routing infrastructure having at least one messaging appliance to receive and route transaction order messages; and
an intermediate infrastructure in communication with the market data delivery and market order routing infrastructures, respectively, wherein the intermediary infrastructure includes:
at least one messaging appliance configured for receiving and routing the market data and transaction order messages; and
an interconnect utilizing channel-based messaging that routes messages over a first messaging layer based on at least one channel, each channel mapped to a subscription topic, each channel assigned to a communication pathway of a second messaging layer,
wherein each of the messaging appliances is further configured to execute the routing of messages it receives by dynamically selecting a message transmission protocol and a message routing path.

44. The enterprise system of claim 43, further comprising:
market data sources for publishing the market data messages; and
market data consumers for receiving the market data messages and for publishing the transaction order messages, the market data consumers including at least one application,
wherein the intermediate infrastructure includes an application programming interface between each application and a messaging appliance in the intermediate infrastructure to which such application programming interface is registered, the application programming interface operative for delivering the market data messages to and transaction order messages from the application.

45. The enterprise system of claim 43, further comprising protocol transformation engines and in which each of the at least one messaging appliance in each of the market data delivery and market order routing infrastructures are configured as edge messaging appliances and each of the at least one messaging appliance in the intermediate infrastructure is configured as core messaging appliances, wherein each edge messaging appliance employs its respective protocol transformation engine to transform messages between external protocol and native protocol, wherein each core messaging appliance is configured for handling messages in the native protocol.

46. The enterprise system of claim 43, wherein the messaging appliances are interconnected to provide network disintermediation.

47. The enterprise system of claim 43, wherein at least one of messaging appliances is an embedded component in a switching or routing device.

48. A method for routing messages in a system with publish/subscribe middleware architecture, comprising:
   providing a messaging fabric having at least one messaging appliance;
   dynamically selecting in a messaging appliance, in real time, a message transmission protocol and a message routing path; and
   routing at least one message from the dynamically selected messaging appliance to a destination.

49. A method as in claim 48, wherein the destination is selected from the group consisting of another messaging appliance, an application programming interface logically linked to the dynamically selected messaging appliance, or both.

50. A method as in claim 48, further comprising:
   interconnecting each messaging appliance with a provisioning and management system; and
   exchanging at least one administrative message between a provisioning and management system and the interconnected messaging appliance, the administrative message being associated with at least one of system configuration, health, performance monitoring, reporting, and namespace management.

51. A method as in claim 48, further comprising transforming the at least one routed message from a native protocol to an external protocol.

52. A method as in claim 48, further comprising transforming the at least one routed message from a native protocol to an external protocol.

53. A method as in claim 48, further comprising:
   logically linking an application programming interface to a messaging appliance; and
   registering, via a topic-based subscription, the application programming interface to the logically linked messaging appliance.

54. A method as in claim 48, further comprising storing the at least one message in a caching engine operatively connected to at least one messaging appliance for providing quality of service functionality.

55. A method as in claim 54, further comprising forwarding the stored message to an application programming interface logically linked to at least one messaging appliance.

56. An end-to-end messaging system with a middleware architecture, comprising:
   at least one messaging appliance configured to receive and route messages; and
   an interconnect utilizing channel-based messaging that routes messages over a first messaging layer based on at least one channel, each channel mapped to a topic, each channel assigned to a communication pathway of a second messaging layer,
   wherein each messaging appliance is further configured to execute the routing of messages by dynamically selecting, in real time, a message transmission protocol and a message routing path.

57. A method for routing messages in an end-to-end messaging system with a middleware architecture, comprising:
   routing, at a messaging appliance, a message over a first messaging layer based on at least one channel, each channel mapped to a topic, each channel assigned to a communication pathway of a second messaging layer, and
   dynamically selecting, at the messaging appliance, in real time, a message transmission protocol and a message routing path.

* * * * *